United States Patent
Nakamura et al.

(10) Patent No.: US 9,639,084 B2
(45) Date of Patent: May 2, 2017

(54) AUTONOMOUS ACTION ROBOT, AND CONTROL METHOD FOR AUTONOMOUS ACTION ROBOT

(71) Applicant: HONDA MOTOR CO., LTD., Tokyo (JP)

(72) Inventors: Keisuke Nakamura, Wako (JP); Kazuhiro Nakadai, Wako (JP)

(73) Assignee: HONDA MOTOR., LTD., Tokyo (JP)

( * ) Notice: Subject to any disclaimer, the term of this patent is extended or adjusted under 35 U.S.C. 154(b) by 99 days.

(21) Appl. No.: 14/831,279

(22) Filed: Aug. 20, 2015

(65) Prior Publication Data

US 2016/0059418 A1     Mar. 3, 2016

(30) Foreign Application Priority Data

Aug. 27, 2014 (JP) ................................. 2014-173147

(51) Int. Cl.
G05B 19/04 (2006.01)
G05B 19/18 (2006.01)
(Continued)

(52) U.S. Cl.
CPC .......... *G05D 1/0274* (2013.01); *G01S 3/8083* (2013.01); *G05D 1/0246* (2013.01);
(Continued)

(58) Field of Classification Search
CPC .. G05D 1/0274; G05D 1/0255; G05D 1/0246; G01S 3/8083; G01S 17/42; Y10S 901/01; Y10S 901/46; Y10S 901/47
(Continued)

(56) References Cited

U.S. PATENT DOCUMENTS 6,459,955 B1 * 10/2002 Bartsch ...................... A47L 9/00
                                                          318/568.11
6,850,818 B2 * 2/2005 Sabe .................. G05B 19/4097
                                                          318/568.1
(Continued)

FOREIGN PATENT DOCUMENTS

JP        2003-062777        3/2003

OTHER PUBLICATIONS

S. Kohlbrecher and J. Meyer and O. von Stryk and U. Klingauf, "A Flexible and Scalable SLAM System with Full 3D Motion Estimation", in Proc. of IEEE International Symposium on Safety, Security and Rescue Robotics (SSRR), pp. 155-160, 2011, Discussed in specification, English text.

(Continued)

Primary Examiner — Jaime Figueroa
(74) Attorney, Agent, or Firm — Rankin, Hill & Clark LLP

(57) ABSTRACT

An autonomous action robot includes: a sound acquisition unit that acquires an acoustic signal; a sound source localization unit that estimates a direction of a sound source with respect to the acoustic signal; a distance measurement unit that performs measurements related to distance for a predetermined range; a map information generation unit that generates two-dimensional map information and that estimates a self-location of the autonomous action robot, using information of the distance; a sound source direction determination unit that re-estimates the direction of the sound source based on the two-dimensional map information, the estimated self-location information, and the estimated sound source direction; an action generation unit that generates an action plan based on the two-dimensional map information and the sound source direction estimated by the sound source direction determination unit; and a control unit that (Continued)

controls the autonomous action robot according to the action plan.

10 Claims, 16 Drawing Sheets

(51) Int. Cl.
*G05D 1/02* (2006.01)
*G01S 3/808* (2006.01)
*G01S 17/42* (2006.01)

(52) U.S. Cl.
CPC ............ *G05D 1/0255* (2013.01); *G01S 17/42* (2013.01); *Y10S 901/01* (2013.01); *Y10S 901/46* (2013.01); *Y10S 901/47* (2013.01)

(58) Field of Classification Search
USPC .................................................. 701/245, 253
See application file for complete search history.

(56) References Cited

U.S. PATENT DOCUMENTS

| | | | | |
|---|---|---|---|---|
| 7,526,361 | B2* | 4/2009 | Nakadai | B25J 13/003 318/568.1 |
| 7,885,145 | B2* | 2/2011 | Marti | G06F 3/011 367/118 |
| 8,098,843 | B2* | 1/2012 | Kawaguchi | G01S 3/801 348/14.1 |
| 8,473,099 | B2* | 6/2013 | Sugiyama | G06F 17/28 700/245 |
| 8,990,078 | B2* | 3/2015 | Nakadai | G08B 5/00 381/58 |
| 9,302,393 | B1* | 4/2016 | Rosen | B25J 9/1694 |
| 9,473,849 | B2* | 10/2016 | Ding | H04R 1/406 |
| 2004/0117063 | A1* | 6/2004 | Sabe | G05B 19/4097 700/245 |
| 2004/0158358 | A1* | 8/2004 | Anezaki | G05D 1/0221 700/264 |
| 2006/0111841 | A1* | 5/2006 | Tseng | B60R 1/00 701/301 |
| 2009/0043423 | A1* | 2/2009 | Sugiyama | G06F 17/28 700/245 |
| 2011/0144850 | A1* | 6/2011 | Jikihara | G05D 1/024 701/26 |
| 2013/0151249 | A1* | 6/2013 | Nakadai | G08B 5/00 704/231 |
| 2014/0012787 | A1* | 1/2014 | Zhang | G06N 5/02 706/12 |
| 2014/0072142 | A1* | 3/2014 | Nakadai | H04R 1/32 381/92 |
| 2015/0052703 | A1* | 2/2015 | Lee | A47L 9/2815 15/319 |
| 2016/0059418 | A1* | 3/2016 | Nakamura | G01S 3/8083 700/253 |

OTHER PUBLICATIONS

J. B. Allen and D. A. Berkley, "Image method for efficiently simulating small-room acoustics", J. Acoust. Soc. Am. vol. 65, No. 4, pp. 943-950 (1979), Discussed in specification, English text.

A. Huang et al., "Visual Odometry and Mapping for Autonomous Flight Using an RGB-D Camera", in Proc. of Int. Symposium on Robotics Research (ISRR), 2011, Discussed in specification, English text.

F. Endres et al., "An Evaluation of the RGB-D SLAM System", in Proc. of the IEEE Int. Conf. on Robotics and Automation (ICRA), pp. 1691-1696, 2012, Discussed in specification, English text.

* cited by examiner

FIG. 13
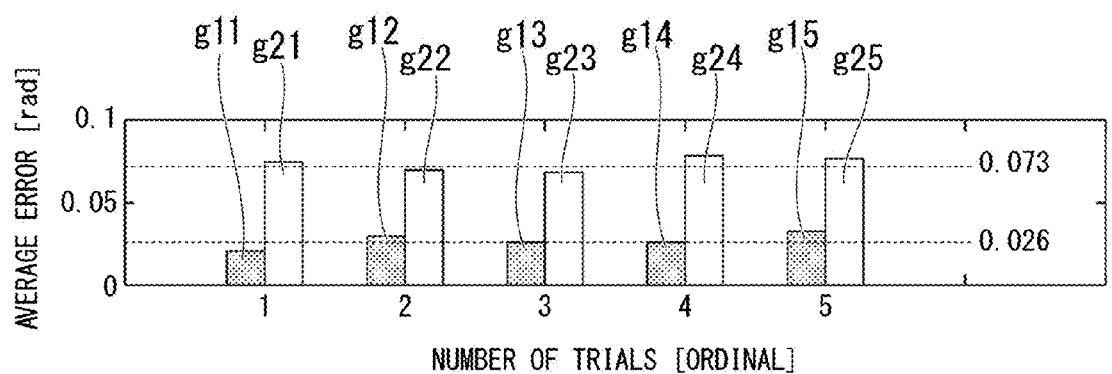
FIG. 14
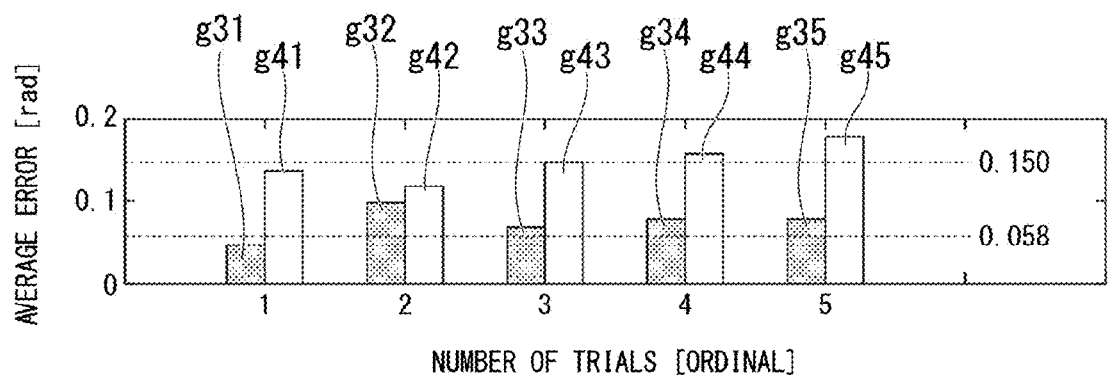
FIG. 15
|  | NUMBER OF SOUND-SOURCE-LOCALIZED FRAMES | NO REFLECTIVE OBJECT | REFLECTIVE OBJECT PRESENT |
|---|---|---|---|
| PASSAGE 1 | 2115 | 84.1% | 92.5% |
| PASSAGE 2 | 2356 | 42.4% | 49.4% |

AUTONOMOUS ACTION ROBOT, AND CONTROL METHOD FOR AUTONOMOUS ACTION ROBOT

CROSS-REFERENCE TO RELATED APPLICATIONS

Priority is claimed on Japanese Patent Application No. 2014-173147, filed Aug. 27, 2014, the contents of which are incorporated herein by reference.

BACKGROUND OF THE INVENTION

Field of the Invention

The present invention relates to an autonomous action robot and a control method for an autonomous action robot.

Description of Related Art

In recent years, there are being developed autonomous action robots that act autonomously with an object of coexisting as partners of humans. Among this type of autonomous action robots, there is one that performs preliminarily determined actions in response to human voice.

For example, the autonomous action robot disclosed in Japanese Unexamined Patent Application, First Publication No. 2003-62777 detects sound emitted from a sound source, and identifies the direction of the sound source based on the detected sound. In the autonomous action robot, it is controlled so that its image capturing unit faces in the identified sound source direction, and an image of the periphery of the sound source direction is captured. Furthermore, in the autonomous action robot, a target image is extracted from the captured image, and control is performed based on the extracted target image so that the image capturing unit faces in the direction toward the target image.

Moreover, in the case where the autonomous action robot is used in a room, the autonomous action robot, in some cases, may not be able to directly acquire sound due to the walls and corners in the room. In this type of case, the sound that the autonomous action robot is acquiring is a direct sound that comes directly from the sound source, a reflection that is reflected on the wall, a sound that is irradiated on the wall and that has transmitted through the wall while being attenuated according to the wall transmission loss, or a sound that travels around a shielding object and that reaches the back side thereof by diffraction.

SUMMARY OF THE INVENTION

However, in the technique disclosed in Japanese Unexamined Patent Application, First Publication No. 2003-62777, the correct sound source direction may not be estimated in those cases where the sound source direction is estimated using a sound other than a direct sound. If the correct sound source direction cannot be estimated, the autonomous action robot may not be able to move to the correct sound source direction in some cases because it is controlled to move to an estimated sound source direction.

An aspect of the present invention takes the above points into consideration, with an object of providing an autonomous action robot that is capable of estimating the direction of a sound source even if it is a sound other than a direct sound, and that is capable of moving to the direction of the sound source, and a control method for an autonomous action robot.

In order to achieve the above object, the present invention employs the following measures.

(1) An autonomous action robot according to an aspect of the present invention is provided with: a sound acquisition unit configured to acquire an acoustic signal; a sound source localization unit configured to estimate a direction of a sound source with respect to the acoustic signal, using the acquired acoustic signal; a distance measurement unit configured to perform measurements related to distance for a predetermined range; a map information generation unit configured to generate two-dimensional map information and that estimates a self-location of the autonomous action robot, using information of the distance; a sound source direction determination unit configured to re-estimate the direction of the sound source by determining whether the acoustic signal is a reflection reflected from a reflective object or a direct sound from the sound source, based on the two-dimensional map information, the estimated self-location information, and the estimated sound source direction; an action generation unit configured to generate an action plan for moving toward a first direction if the acoustic signal is determined as a reflection and that generates an action plan for moving toward a second direction that differs from the first direction if the acoustic signal is determined as a direct sound, based on the two-dimensional map information and the sound source direction estimated by the sound source direction determination unit; and a control unit configured to control the autonomous action robot according to the action plan.

(2) In the aspect of (1) above, the second direction may be a direction that is closer to the sound source than the first direction.

(3) In the aspect of either one of (1) and (2) above, there may be further provided a detection unit configured to detect angular velocity and acceleration of the autonomous action robot, and the map information generation unit may correct the estimated self-location, using detection results detected by the detection unit.

(4) In the aspect of any one of (1) through (3) above, there may be further provided an image capturing unit configured to capture images, and an integration unit configured to integrate the generated two-dimensional map information and three-dimensional map information that uses a three-dimensional image based on the captured image, and the action generation unit may generate an action plan, using map information that is integrated by the integration unit.

(5) In the aspect of any one of (1) through (4) above, the sound source direction determination unit may: calculate a line segment that shows a relationship between an estimated self-location and an obstacle at each frame, using the sound source direction localized by the sound source localization unit and the estimated self-location that indicates the self-location estimated by the map information generation unit; calculate an intersection point between the line segment and the obstacle at a given frame; calculate two points in the vicinity of the calculated intersection point on the line segment at the given frame; calculate the total distance from the calculated two points to the line segment at an f-th frame (where f is an integer not less than 2); and determine whether the acoustic signal is a direct sound or a reflection based on the calculated results.

(6) In the aspect of (5) above, the sound source direction determination unit may use the sound source direction localized by the sound source localization unit and information showing the self-location estimated by the map information generation unit, and calculate the line segment $\Gamma_f^w$ that shows the relationship between the estimated self-location and the obstacle at each frame, using the following equation;

$$\Gamma_f^w(x^w, y^w) = \cos(\psi_f^r + \theta_f^w)(y^w - y_f^w) - \sin(\psi_f^r + \theta_f^w)(x^w - x_f^w) \quad \text{[Equation 1]}$$
$$= 0$$

(where $\psi_f^r$ is a direction angle to an acoustic signal at the f-th frame with respect to an x axis of the robot coordinate system $C^r$ at the f-th frame, $\theta_f^w$ is a direction angle from the x axis of the robot coordinate system $C^r$ to an x axis of a world coordinate system $C^w$, $y^w$ is a y coordinate in the world coordinate system, $x^w$ is an x coordinate in the world coordinate system, $y_f^w$ is a y coordinate in the world coordinate system at the f-th frame, and $x_f^w$ is an x coordinate in the world coordinate system at the f-th frame).

(7) In the aspect of either one of (5) and (6) above, the sound source direction determination unit may calculate two points $p_+^{\sim w}$ and $p_-^{\sim w}$ in the vicinity of the intersection point calculated on the line segment at the given frame, using the following equation;

$$\tilde{p}_\pm^w = p_1^w + (1 \pm \alpha)(\tilde{p}^w - p_1^w) \quad \text{[Equation 2]}$$

(where $p^{\sim w}$ is an intersection point between the line segment and the obstacle at the given frame, $p_1^w$ is a coordinate of the autonomous action robot at a first frame in a world coordinate system $C^w$, and $\alpha$ is a predetermined value).

(8) In the aspect of any one of (5) through (7) above, the sound source direction determination unit may calculate total distances $d_+^{\sim W}$ and $d_-^{\sim W}$ from the calculated two points to the line segment at the f-th frame, using the following equation;

$$\tilde{d}_\pm^W = \sum_{f=1}^{F} |\cos(\psi_f^r + \theta_f^w)(y_\pm^w - y_f^w) - \sin(\psi_f^r + \theta_f^w)(x_\pm^w - x_f^w)| \quad \text{[Equation 3]}$$

and if the calculated $d_-^{\sim W}$ is less than $d_+^{\sim w}$, the acoustic signal may be determined as a direct sound, and if the calculated $d_-^{\sim W}$ is not less than $d_+^{\sim w}$, the acoustic signal may be determined as a reflection.

(9) In the aspect of any one of (1) through (8) above, a moving speed when progressing toward the second direction may be faster than that at the time of progressing toward the first direction.

(10) A control method for an autonomous action robot according to an aspect of the present invention includes: a sound acquisition step of acquiring an acoustic signal by means of a sound acquisition unit; a sound source localization step of estimating a direction of a sound source with respect to the acoustic signal, using the acquired acoustic signal, by means of a sound source localization unit; a distance measurement step of performing measurements related to distance for a predetermined range by means of a distance measurement unit; a map information generation step of generating two-dimensional map information and estimating a self-location of the autonomous action robot, using information of the distance, by means of a map information generation unit; a sound source direction determination step of re-estimating the direction of the sound source by determining whether the acoustic signal is a reflection reflected from a reflective object or a direct sound from the sound source, based on the two-dimensional map information, the estimated self-location information, and the estimated sound source direction, by means of a sound source direction determination unit; an action generation step of generating an action plan for moving toward a first direction if the acoustic signal is determined as a reflection and generating an action plan for moving toward a second direction that differs from the first direction if the acoustic signal is determined as a direct sound, based on the two-dimensional map information and the sound source direction estimated by the sound source direction determination unit, by means of an action generation unit; and a control step of controlling the autonomous action robot according to the action plan, by means of a control unit.

According to the aspect of either one of (1) and (10) above, it is possible to determine whether an acquired acoustic signal is a direct sound or a reflection, based on the acquired acoustic signal and map information. As a result, according to this configuration, the autonomous action robot can be moved toward the first direction if a direct sound cannot be acquired from the position where the autonomous action robot is present, and the autonomous action robot can be moved toward the second direction, which is a sound source direction different from the first direction, if a direct sound can be acquired from the position where the autonomous action robot is present. Therefore, the autonomous action robot can be moved smoothly.

According to the aspect of (2) above, the autonomous action robot can be moved toward the first direction if a direct sound cannot be acquired from the position where the autonomous action robot is present, and the autonomous action robot can be moved toward the second direction which is a sound source direction different from the first direction, if a direct sound can be acquired from the position where the autonomous action robot is present. As a result, according to this configuration, the autonomous action robot can be moved smoothly toward the sound source direction.

According to the aspect of (3) above, since the self-location that is estimated with use of detection results detected by the detection unit is corrected, map information related to distance and angle can be measured at a high level of precision even in the case of an irregular terrain.

According to the aspect of (4) above, since three-dimensional map information can be generated by integrating captured image information with two-dimensional map information, it is possible to generate highly precise three-dimensional map information at a low level of computation load. With this three-dimensional map information, it is possible to cause the autonomous action robot to avoid an obstacle, and move smoothly toward the sound source direction.

According to the aspect of any one of (5) through (8) above, it is possible to determine whether the estimated acoustic signal is a direct sound or a reflection, using the sound source direction localized by the sound source localization unit and the self-location estimated by the map information generation unit. According to this determination result, the autonomous action robot can be moved smoothly toward the sound source direction.

According to the aspect of (9) above, according to the type of acquired acoustic signal, the moving speed of the autonomous action robot can be changed, and therefore, the robot can be moved smoothly toward the sound source direction.

BRIEF DESCRIPTION OF THE DRAWINGS

FIG. 13 is a diagram for describing the results of measurements performed in the passage 1 including a T-junction.

FIG. 14 is a diagram for describing the results of measurements performed in the passage 2.

FIG. 15 is a diagram for describing an example of the results of measurements related to sound source localization.

DETAILED DESCRIPTION OF THE INVENTION

First, a brief summary of the present invention is described.

In the present embodiment, an autonomous action capable robot that acts autonomously (hereunder, also be referred to as an autonomous action robot or robot) estimates the direction of a sound source, using an acquired acoustic signal. Moreover, the autonomous action robot uses information obtained via sensors to generate two-dimensional map information. The autonomous action robot then uses the generated two-dimensional map information to detect an obstacle such as a wall. Moreover, the autonomous action capable robot determines whether the acoustic signal is a direct sound or a reflection, based on the map information, a sound source localization result, and obstacle presence. Then, the autonomous action robot performs control so as to progress toward the first direction if the acquired acoustic signal is a reflection, and it performs control so as to progress toward the second direction, which is a sound source direction different from the first direction, if the acquired acoustic signal is a direct sound. As a result, the autonomous action robot can smoothly move toward the sound source direction while avoiding the obstacle.

Hereunder, embodiments of the present invention are described with reference to the figures. Furthermore, in the following description, an autonomous action robot is described and is taken as an example of an autonomous mobile apparatus. However, the autonomous mobile apparatus may be any apparatus that is capable of moving autonomously.

First Embodiment

Figure 1:
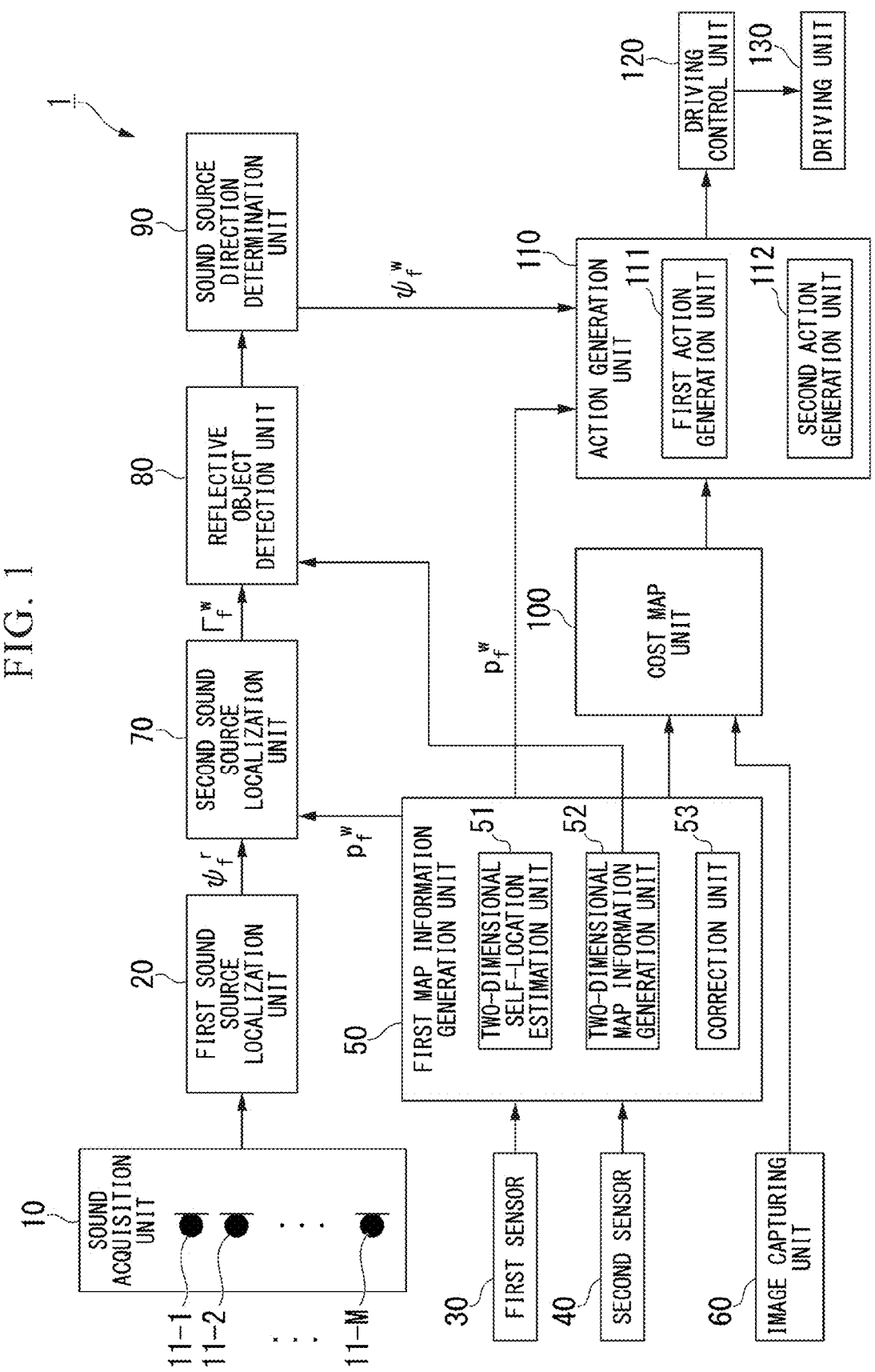
FIG. 1 is a block diagram showing a configuration of an autonomous action robot according to a first embodiment.

FIG. 1 is a block diagram showing a configuration of an autonomous action capable robot 1 according to the present embodiment.

As shown in FIG. 1, the robot 1 includes; a sound acquisition unit 10, a first sound source localization unit 20 (sound source localization unit; local SSL), a first sensor 30 (distance measurement unit), a second sensor 40 (detection unit), a first map information generation unit 50 (map information generation unit), an image capturing unit 60, a second sound source localization unit 70 (sound source direction determination unit; global SSL), a reflective object detection unit 80 (sound source direction determination unit; reflection detection), a sound source direction determination unit 90 (goal decision), a cost map unit 100 (cost map), an action generation unit 110, a driving control unit 120 (control unit), and a driving unit 130.

Figure 2:
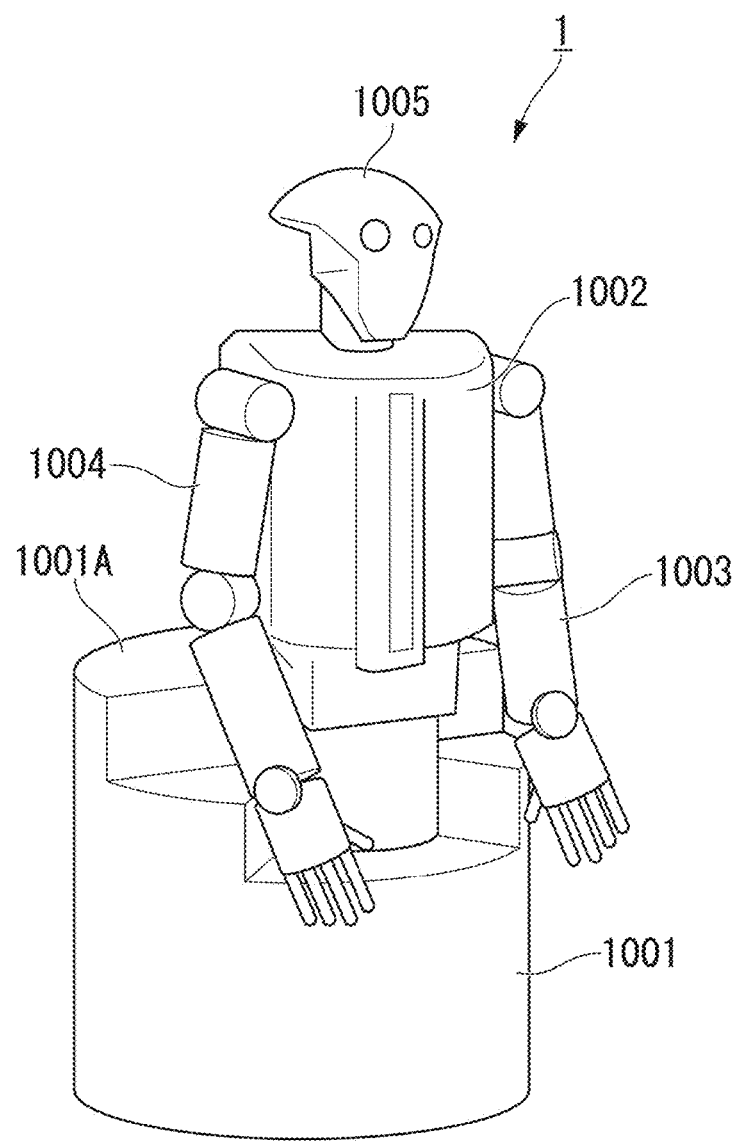
FIG. 2 is a diagram for describing an example of the external appearance of the robot according to the first embodiment.

FIG. 2 is a diagram for describing an example of the external appearance of the robot 1 according to the present embodiment. As shown in FIG. 2, the robot 1 is such that a body 1002 is movably mounted on a base 1001. On the base 1001 there are mounted wheels (not shown in the figure), and there is further mounted a second sensor 40. The second sensor 40 may be mounted inside the body 1002 for example. Moreover, on the body 1002 there are mounted a left arm 1003 (including a hand unit), a right arm 1004 (including a hand unit), and a head unit 1005. A driving control unit of the left arm 1003, the right arm 1004, and the head unit 1005, and a driving unit, and the function units shown in FIG. 1 may be mounted inside the body 1002 or the base 1001 for example.

Furthermore, in the present embodiment, the sound acquisition unit 10, the first sensor 30, and the image capturing unit 60 are installed on the upper plane 1001A of the base 1001. However, the configuration is not limited to this. For example, the sound acquisition unit 10 may be attached to the periphery part of the head unit 1005, and the image capturing unit 60 may be attached to the head unit 1005 or the body 1002. Moreover, the first sensor 30 may also be attached to any one of the base 1001, the body 1002, and the head unit 1005.

Furthermore, the external appearance of the robot 1 shown in FIG. 2 is an example, and the robot 1 may be provided with leg parts instead of the base 1001.

The sound acquisition unit 10 acquires acoustic signals of M channels (M is an integer greater than 1, such as 8), and it transmits the acquired acoustic signals of M channels to the first sound source localization unit 20. The sound acquisition unit 10 is provided, for example, with M microphones 11-1 to 11-M that receive sound waves having a frequency band (for example, 200 Hz to 4 kHz) component. Hereunder, the microphones among the microphones 11-1 to 11-M are simply referred to microphones 11 unless specified. The M microphones 11 are arranged respectively in different positions. The sound acquisition unit 10 may transmit the acquired acoustic signals of M channels in a wireless manner, and may transmit them in a wired manner. In the case where M is greater than 1, it is sufficient that acoustic signals are synchronized between channels at the time of transmission.

The first sound source localization unit 20 preliminarily stores a transfer function A. The first sound source localization unit 20 obtains M acoustic signals acquired by M microphones 11 of the sound acquisition unit 10. The first sound source localization unit 20 converts the obtained acoustic signals from analog signals into digital signals. Using the converted M acoustic signals, the first sound source localization unit 20 estimates the direction of each sound source by means of the stored transfer function A while using the MUSIC (MUltiple SIgnal Classification) method, the beam forming method or the like (hereunder, referred to as sound source localization). The transfer function A may be preliminarily measured in an environment where the robot 1 is to be actually used for example. Here, the sound source is a human that makes a verbal utterance or a speaker that outputs music. The first sound source localization unit 20 outputs first sound source localization information indicating the sound source localization result to the second sound source localization unit 70. The first sound source localization unit 20 may separate the acquired M acoustic signals and may perform a sound source localization process on each separated sound source, by means of a commonly known method. Moreover, the first sound source localization unit 20 may suppress reverberation components by means of a commonly known method.

The first sensor 30 is a distance sensor, and is, for example, a LRF (Laser Range Finder) sensor. The LRF sensor is a two-dimensional scanner that detects the distance from and direction of an object by scanning a detection target space at a predetermined pitch while emitting laser light and measuring the length of time that it takes to return after having been reflected on the object.

The LRF sensor outputs by a wireless or wired means, to the first map information generation unit 50, the information including the detected distance from and direction of the object as first detection information. The first detection information includes at least an x axis component and a y axis component with respect to the xy plane, which is a plane horizontal to the floor. In the present embodiment, an example of using an LRF sensor is described as an example of the first sensor 30. However, the sensor is not limited to this, and may be another type of sensor. Moreover, several LRF sensors may be provided instead of providing one.

The second sensor 40 is an IMU (Inertial Measurement Unit), and is a sensor that detects three axis angles (or angular velocity) and acceleration that govern movement of the robot 1. The second sensor 40 detects a three-dimensional angular velocity and acceleration, by means of a three-axis gyro and three-direction accelerometer for example. The second sensor 40 outputs to the first map information generation unit 50, the detection result that have been detected, as second detection information.

The first map information generation unit 50 is provided with a two-dimensional self-location estimation unit 51 (global 2D self-localization), a two-dimensional map information generation unit 52 (global 2D occupancy grid map), and a correction unit 53.

The two-dimensional self-location estimation unit 51 and the two-dimensional map information generation unit 52 simultaneously perform generation of two-dimensional map information and self-location estimation, by means of a Hector SLAM (Simultaneous Localization and Mapping) method (refer to Reference Literature 1).

For example, the first map information generation unit 50 first decides the coordinate of the initial location, and obtains first detection information that is obtained from the location. Then it performs a sampling process on the obtained first detection information, and estimates the shape of the object observed within the region where the first detection information is obtained, to thereby generate map information. The robot 1, while moving, obtains first detection information at predetermined temporal intervals (at each frame) for example, and estimates the shape of the object observed within the region. The first map information generation unit 50 then extracts a feature value of the map information generated at each frame, and generates map information that is combined by means of correlated computation with respect to the map information from which the feature value is extracted. The first map information generation unit 50 performs a re-sampling process on the combined map information and on the path through which the robot 1 has moved.

The first map information generation unit 50 repeats the above process to thereby perform map information generation and self-location estimation simultaneously.

Reference Literature 1: S. Kohlbrecher and J. Meyer and O. von Stryk and U. Klingauf, "A Flexible and Scalable SLAM System with Full 3D Motion Estimation", in Proc. of IEEE International Symposium on Safety, Security and Rescue Robotics (SSRR), pp. 155-160, 2011.

The two-dimensional self-location estimation unit 51, for example, by means of the Hector SLAM method mentioned above, estimates the location and inclination (also referred to as attitude) in the robot coordinate system, using the first detection information input from the first sensor 30. The two-dimensional self-location estimation unit 51 estimates the current self-location, using the following equation (1) for example.

$$\text{Current self-location}(x,y,\theta) = \text{location at previous time } (x',y',\theta') + \text{relative location}(\Delta x, \Delta y, \Delta \theta) \quad (1)$$

In the equation (1), x, y are an x axis direction value and a y axis direction value on the two-dimensional map, and $\theta$ is an attitude.

Figure 3:
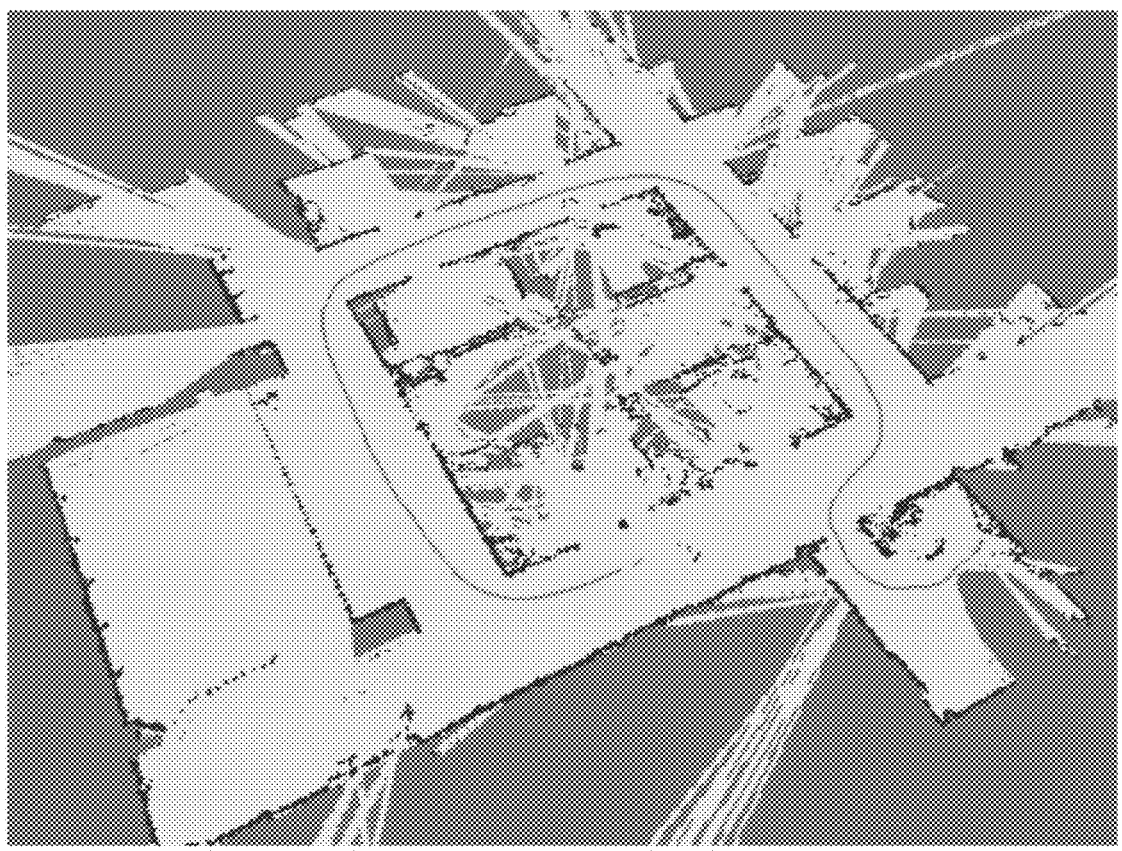
FIG. 3 is a diagram for describing an example of two-dimensional map information according to the first embodiment.

As described earlier, the two-dimensional map information generation unit 52, by means of the Hector SLAM method for example, generates two-dimensional map information as shown in FIG. 3, using the first detection information input from the first sensor 30. FIG. 3 is a diagram for describing an example of two-dimensional map information according to the present embodiment.

The map information example shown in FIG. 3 is an example observed after information has been collected and the map information has been built.

Figure 4:
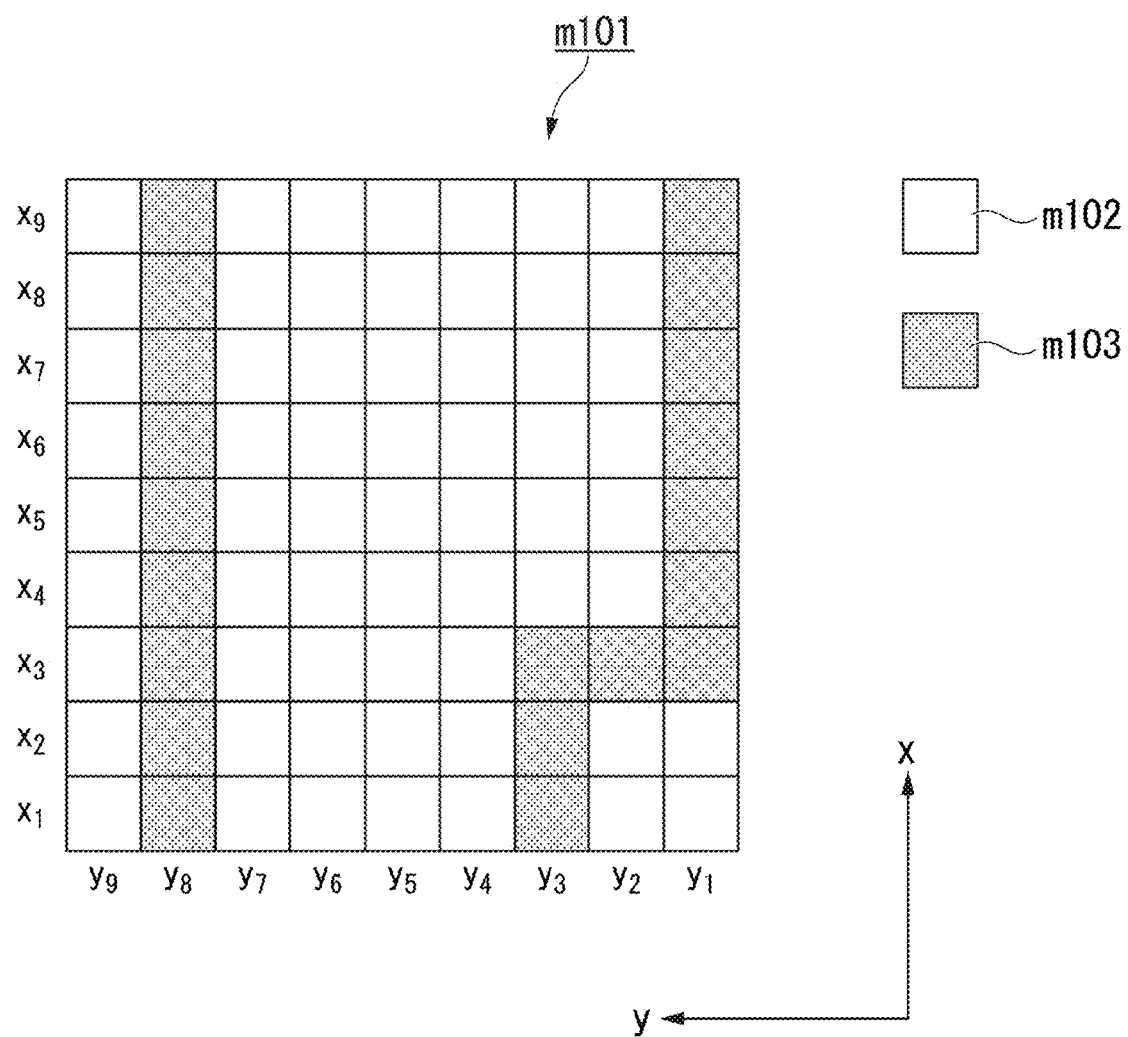
FIG. 4 is a diagram for describing an example of two-dimensional grid map information according to the first embodiment.

As shown in FIG. 4, the two-dimensional map information generation unit 52 estimates the location and inclination of the robot itself in the global coordinate system in each grid of a predefined size, and registers it in an environment map.

FIG. 4 is a diagram for describing an example of two-dimensional grid map information according to the present embodiment. In FIG. 4, for example, the traveling direction of the robot 1 is the x axis direction, and the left-right direction of the robot 1 is the y axis direction.

The robot 1 generates grid map information m101 while moving in the direction from $x_1$ to $x_9$ for example. Moreover, in FIG. 4, reference symbol m102 each denotes a grid showing an obstacle-free space region, and reference symbol m103 each denotes a region of a space with an obstacle. Here, examples of an obstacle include walls that are present on the left and right side of a passage. The two-dimensional map information generation unit 52 outputs to the reflective object detection unit 80, the generated two-dimensional map information.

The correction unit 53 corrects the self-location estimated by the two-dimensional self-location estimation unit 51, using the second detection information input from the second sensor 40. Here is described a reason for correcting the self-location with use of second detection information in this manner. In the SLAM method, it is assumed that the robot 1 moves on a flat plane, and therefore, there may be some cases where the robot moving on an irregular terrain with an irregular floor or ground surface causes displacement from the two-dimensional plane. This type of displacement becomes an observation noise, and the level of self-location estimation precision may be deteriorated in some cases. Therefore, in the present embodiment, by correcting displacement from the two-dimensional plane by using the second detection information obtained from the second sensor 40, it is possible to perform robust self-location estimation against observation noise. The correction method performed by the correction unit 53 is described later.

The image capturing unit 60 captures an image at predetermined intervals, and outputs the captured image information to the cost map unit 100. The image capturing unit 60 is an RGB-D camera for example. Here, an RGB-D camera is a camera that is capable of obtaining depth images in addition to RGB images. Furthermore, the image capturing unit 60 may be a stereo camera comprising two cameras.

The second sound source localization unit 70 (global SSL) receives input of first sound source localization information from the first sound source localization unit 20, and receives input of information indicating a self-location and two-dimensional map information from the first map information generation unit 50.

The second sound source localization unit 70 uses the sound source direction localized by the first sound source localization unit 20 and information showing the self-location estimated by the first map information generation unit 50, to calculate the line segment that shows relationship between the estimated self-location and the obstacle at each frame, and it outputs an equation showing the calculated line segment, to the reflective object detection unit 80. The line segment calculation method is described later.

The reflective object detection unit 80 calculates the intersection point between the line segment and the obstacle at a given frame. The reflective object detection unit 80 then calculates two points in the vicinity of the intersection point calculated on the line segment at the given frame, and it calculates the total distance from the calculated two points to the line segment at the f-th frame (where f is an integer not less than 2). Next, the reflective object detection unit 80 determines whether the acoustic signal is a direct sound or a reflection based on the calculation result, and outputs the determined determination result to the sound source direction determination unit 90. The intersection point calculation method is described later.

The sound source direction determination unit 90 determines the direction of the sound source based on the determination result input from the reflective object detection unit 80, and outputs the determined sound source localization result to the action generation unit 110. The direction determined by the sound source direction determination unit 90 is the destination to which the robot 1 is traveling.

Figure 5:
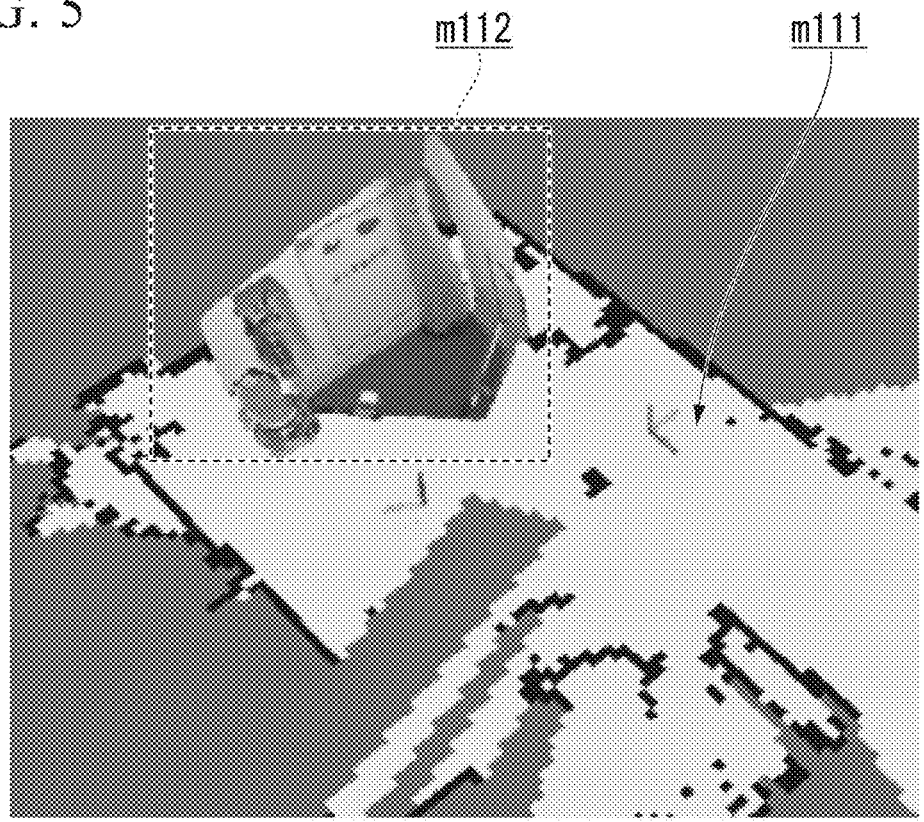
FIG. 5 is a diagram for describing an example of map information in which an RGB-D image is combined with a two-dimensional map, according to the first embodiment.

The cost map unit 100 receives input of two-dimensional map information from the first map information generation unit 50, and receives input of image information from the image capturing unit 60. The cost map unit 100 integrates the input two-dimensional map information with the image information, and generates map information as shown in FIG. 5. The location and the orientation of the image capturing unit 60 can be found from the two-dimensional coordinate and orientation of the robot 1 obtained from the two-dimensional map information (SLAM). Therefore, the cost map unit 100 generates three-dimensional map information as shown in FIG. 5 by projecting the image captured by the image capturing unit 60 from the coordinate of the robot. The three-dimensional map information created in this manner is also referred to as cost map. The created cost map is used in the action generation unit 110 for the robot 1 to avoid an obstacle and determine the direction of traveling at the next frame. The cost map unit 100 outputs the created cost map information to the action generation unit 110.

FIG. 5 is a diagram for describing an example of map information in which an RGB-D image is combined with a two-dimensional map, according to the present embodiment. In FIG. 5, the image of the region denoted with reference symbol m111 is a diagram of the two-dimensional map information generated by the two-dimensional map information generation unit 52. Moreover, the image of the region denoted with reference symbol m112 is an image captured by the image capturing unit 60.

The action generation unit 110 receives input of f-th frame self-location information $p_f^w$ from the first map information generation unit 50, receives input of the direction angle $\psi_f^w$ of the sound source localization result from the sound source direction determination unit 90, and receives input of cost map information from the cost map unit 100. The action generation unit 110 includes a first action generation unit 111, and a second action generation unit 112.

The first action generation unit 111 generates a first action plan indicating the action path of the robot 1, based on the inputs of the self-location information $p_f^w$, the sound source direction angle $\psi_f^w$, and the cost map information.

The second action generation unit 112 generates a second action plan of the robot 1 for avoiding an obstacle, based on the inputs of the self-location information $p_f^w$ and the cost map information.

The action generation unit 110 integrates the generated first action plan and second action plan to generate an action plan, and outputs information indicating the generated action plan, to the driving control unit 120.

The driving control unit 120 generates driving signals for controlling operations of the robot 1 according to the information indicating the action plan input from the action generation unit 110, and outputs the generated driving signals to the driving unit 130.

The driving unit 130 drives wheels or the like installed in the base 1001 shown in FIG. 2, according to the driving signal input from the driving control unit 120.

<First Sound Localization>

Here is described a process performed by the first sound source localization unit 20.

First sound source localization unit 20 receives an input of sound that has been emitted from a sound source (not shown in the figure) and that has been acquired by the sound acquisition unit 10 in a predetermined space, and it stores a transfer function A ($\omega$, $\psi^r$) calculated by a transfer function calculation unit (not shown in the figure). Here, $\omega$ represents frequency, and $\psi^r$ represents a sound source direction angle seen from the robot coordinate system (hereunder, a coordinate seen from the robot coordinate system is expressed with a superscript letter r).

The first sound source localization unit 20 eigenvalue-expands the correlation matrix R $(\omega, f) \in C^{M \times M}$ of acoustic input signals of M channels acquired by the sound acquisition unit 10, as the following equation (2).

$$R(\omega, f) = E(\omega, f) \wedge (\omega, f) E^{-1}(\omega, f) \qquad (2)$$

In the equation (2), $\wedge (\omega, f)$ is an eigenvalue and is expressed as the following equation (3), and E $(\omega, f)$ is an eigenvalue vector and is expressed as the following equation (4).

$$\wedge (\omega, f) = diag(\lambda_1(\omega, f), \ldots, \lambda_M(\omega, f)) \qquad (3)$$

$$E(\omega, f) = [e_1(\omega, f), \ldots, e_M(\omega, f)] \qquad (4)$$

In the equation (3), diag ( . . . ) represents a diagonal matrix. Moreover, eigenvectors are in the order of magnitude of corresponding eigenvalues $e_m (\omega, f)$ (where m is not less than 1 and not more than M).

The spatial spectrum P is expressed as the following equation (5).

$$P(\omega, f) = \frac{1}{\omega_h - \omega_l + 1} \sum_{\omega=\omega_l}^{\omega_h} \frac{|A^*(\omega, \psi^r) A(\omega, \psi^r)|}{\sum_{m=L+1}^{M} |A^*(\omega, \psi^r) e_m(\omega, f)|} \qquad (5)$$

In the equation (5), the superscript character * is a complex conjugate transpose operator, and L is the number of sound sources. Moreover, $\omega_l$ represents the minimum value of frequency $\omega$, and $\omega_h$ represents the maximum value of frequency $\omega$. Accordingly, the spatial spectrum P of the equation (5) is averaged by $\omega_l \leq \omega \leq \omega_h$. $\|$ represents an absolute value symbol.

The first sound source localization unit 20 treats L peaks detected with the spatial spectrum P as the sound source direction, and estimates the direction angle $\psi^r$ of the sound source direction. Hereunder, the estimation result at the f-th frame is expressed as $\psi_f^r$.

The first sound source localization unit 20 outputs the estimation result $\psi_f^r$ to the second sound source localization unit 70.

<Self-Location Correction>

Next, correction performed by the correction unit 53 is described. The state space model for correction is expressed as the following equation (6).

$$x = (\Omega^T, p^T, v^T)^T \qquad (6)$$

In the equation (6), $\Omega$ is an Euler angle showing the relationship from the robot coordinate system to the world coordinate system and is expressed as the following equation (7). p is a translational location and is expressed as the following equation (8). v is a translational velocity and is expressed as the following equation (9).

$$\Omega = (\phi, \theta, \psi)^T \qquad (7)$$

$$p = (p_x, p_y, p_z)^T \qquad (8)$$

$$v = (v_x, v_y, v_z)^T \qquad (9)$$

In the robot coordinate system, the height direction is taken as the z axis direction, and the plane parallel with the floor is taken as the xy plane. In the equations (6) through (9), superscript letter T represents a transposed matrix. Moreover, in the equation (7), $\phi$, $\theta$, and $\psi$ are respectively a roll angle, a pitch angle, and a yaw angle. A translational movement is a movement in which all points on a rigid body move the same distance, in the same direction, and at the same time.

Information of the following equation (10) is input from the second sensor 40.

$$u = (\omega^T, a^T)^T \qquad (10)$$

In the equation (10), $\omega$ is an angular velocity of an attitude angle and is expressed as the following equation (11), and a is a translational acceleration and is expressed as the following equation (12).

$$\omega = (\omega_x, \omega_y, \omega_z)^T \qquad (11)$$

$$a = (a_x, a_y, a_z)^T \qquad (12)$$

The correction model is expressed as the following equation (13).

$$\dot{\Omega} = E_\Omega \omega$$

$$\dot{p} = v$$

$$\dot{v} = R_\Omega a + g \qquad (13)$$

In the equation (13), $R_\Omega$ represents coordinate conversion from the robot coordinate system to the world coordinate system, $E_\Omega$ represents coordinate conversion from the attitude coordinate of the second sensor 40 to the attitude coordinate of the robot, and g represents gravity acceleration.

Figure 6:
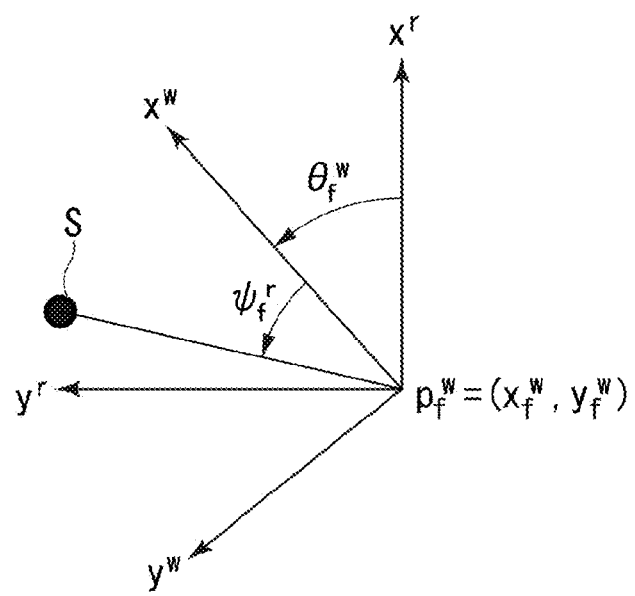
FIG. 6 is a diagram for describing a relationship between a robot coordinate system and a world coordinate system.

FIG. 6 is a diagram for describing a relationship between a robot coordinate system and a world coordinate system. In FIG. 6, reference symbol S denotes a sound source. Moreover, $x^r$ is the x axis of the robot coordinate system, and $\psi^r$ is the y axis of the robot coordinate system. Furthermore, $x^w$ is the x axis of the world coordinate system, and $y^w$ is the y axis of the world coordinate system. The robot coordinate system may be represented as $C^r$, and the world coordinate system may be represented as $C^w$. As shown in FIG. 6, the direction angle from the x axis of the robot coordinate system $C^r$ to the x axis of the world coordinate system $C^w$ is taken as $\theta_f^w$. The direction angle of the sound source S at the f-th frame with respect to the x axis of the world coordinate system $C^w$ is taken as $\psi_f^r$. That is to say, in the world coordinate system $C^w$, the direction angle from the x axis of the robot coordinate system $C^r$ to the sound source S is $\theta_f^w + \psi_f^r$.

The correction unit 53 performs conversion of the self-location estimated in the robot coordinate system $C^r$, and coordinate conversion, using the equation (13). The self-location information $p_f^w$ and the direction angle $\theta_f^w$ at the f-th frame after the correction and coordinate conversion, is expressed as the following equation (14).

$$p_f^w = (x_f^w, y_f^w)$$

$$\theta_f^w \qquad (14)$$

The first map information generation unit 50 outputs, to the second sound source localization unit 70 and the action generation unit 110, the generated map information, and the self-location information $p_f^w$ at the f-th frame after the correction and coordinate conversion.

<Second Sound Localization>

Next is described a process performed by the second sound source localization unit 70.

In the present embodiment, it is assumed that reflection of sound conforms to a virtual image model (refer to Reference Literature 2). Here, a virtual image model is a model in which, a mirror image (virtual sound source) is assumed with respect to a true sound source in those cases where a sound source is present on the far side of an obstacle such as a wall, the wall is treated as a mirror, and sound is reflected on the mirror surface.

Reference Literature 2: J. B. Allen and D. A. Berkley, "Image method for efficiently simulating small-room acoustics", J. Acoust. Soc. Am. vol. 65, no. 4, 943 (1979).

Figure 7:
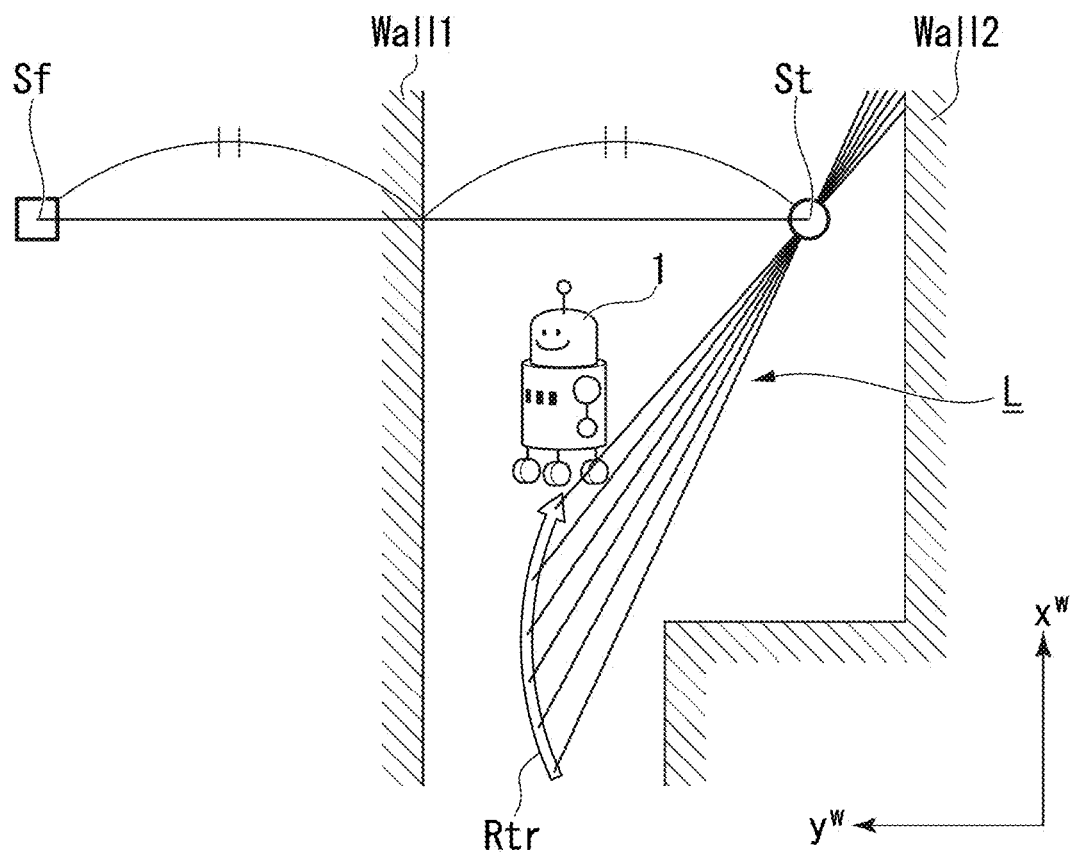
FIG. 7 is a diagram for describing a case where the robot performs sound source localization with respect to a direct sound.
Figure 8:
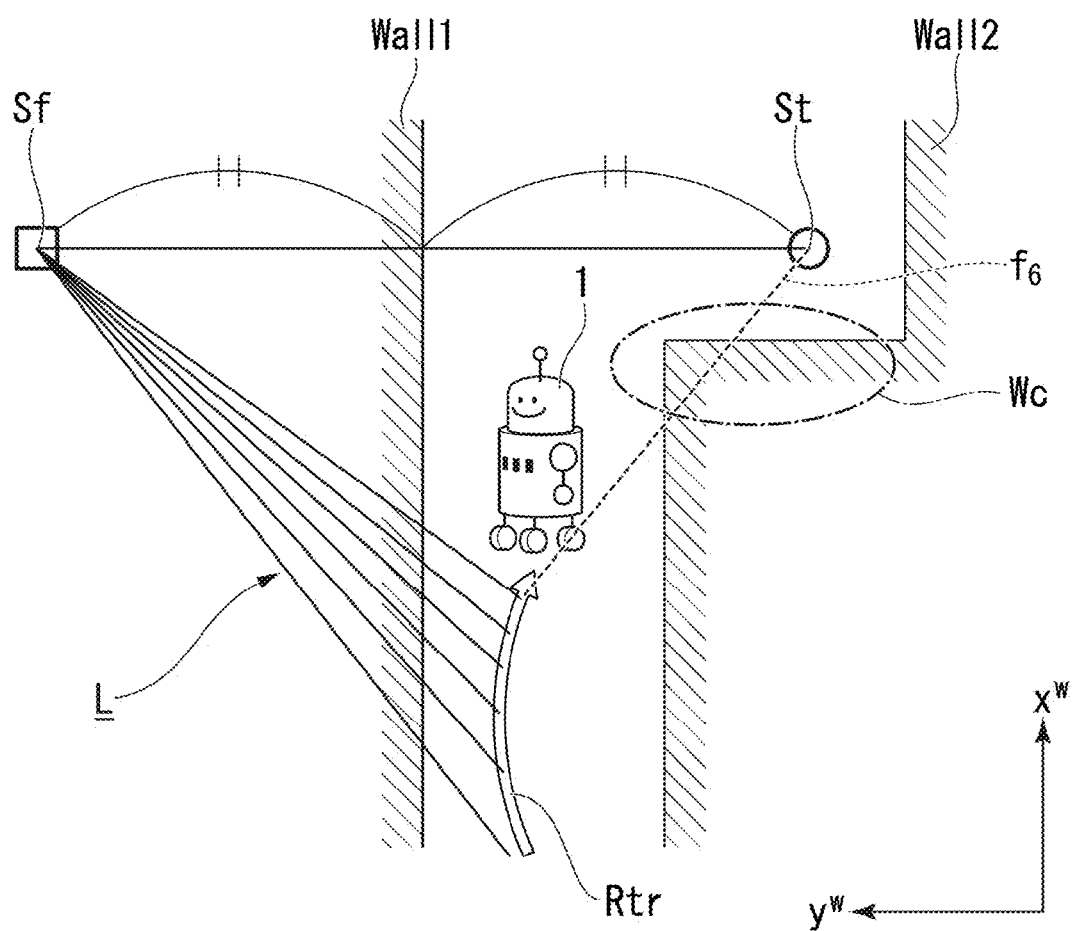
FIG. 8 is a diagram for describing a case where the robot performs sound source localization with respect to a reflection.

FIG. 7 is a diagram for describing a case where the robot 1 performs sound source localization with respect to a direct sound. FIG. 8 is a diagram for describing a case where the robot 1 performs sound source localization with respect to a reflection. In FIG. 7 and FIG. 8, the traveling direction of the robot 1 is the x axis direction, and the left-right direction of the robot 1 is the y axis direction. Moreover, in FIG. 7 and FIG. 8, reference symbol L denotes the sound source localization result at f frame intervals ($\psi_f^r$), and reference symbol Rtr denotes a path through which the robot 1 has moved. Furthermore, reference symbol St denotes a true sound source, and reference symbol Sf denotes a false sound source (mirror image) by a reflection.

In the example shown in FIG. 7, there is shown an example where the true sound source St is present at a location where a direct sound can be acquired from the location to which the robot 1 has moved. Accordingly, L that indicates the result of sound source localization performed by the robot 1 focuses on the location of the true sound source St.

In the example shown in FIG. 8, there is shown an example where the true sound source St is present at a location where a direct sound cannot be acquired from the location to which the robot 1 has moved. In FIG. 8, if f frames are 1 to 6 frames, even at the sixth frame location, as can be seen with the chain line $f_6$, the wall of the wall Wall2 of the region surrounded by reference symbol We obstructs direct sound, and therefore, the robot 1 cannot acquire a direct sound. Therefore, the robot 1 performs a sound source localization process on the mirror image (false sound source Sf), which is a reflection on the opposite side of the wall Wall1, with respect to the true sound source St. As a result, L that indicates the result of sound source localization performed by the robot 1 focuses on the location of the false sound source Sf, which is a mirror image.

As has been described using FIG. 7 and FIG. 8, it is possible to determine whether the focus point that meets the result of sound source localization is on the inner side of the obstacle (on the robot side) or on the outer side, by identifying whether the sound source localized by the robot 1 is a direct sound or a reflection.

Figure 9:
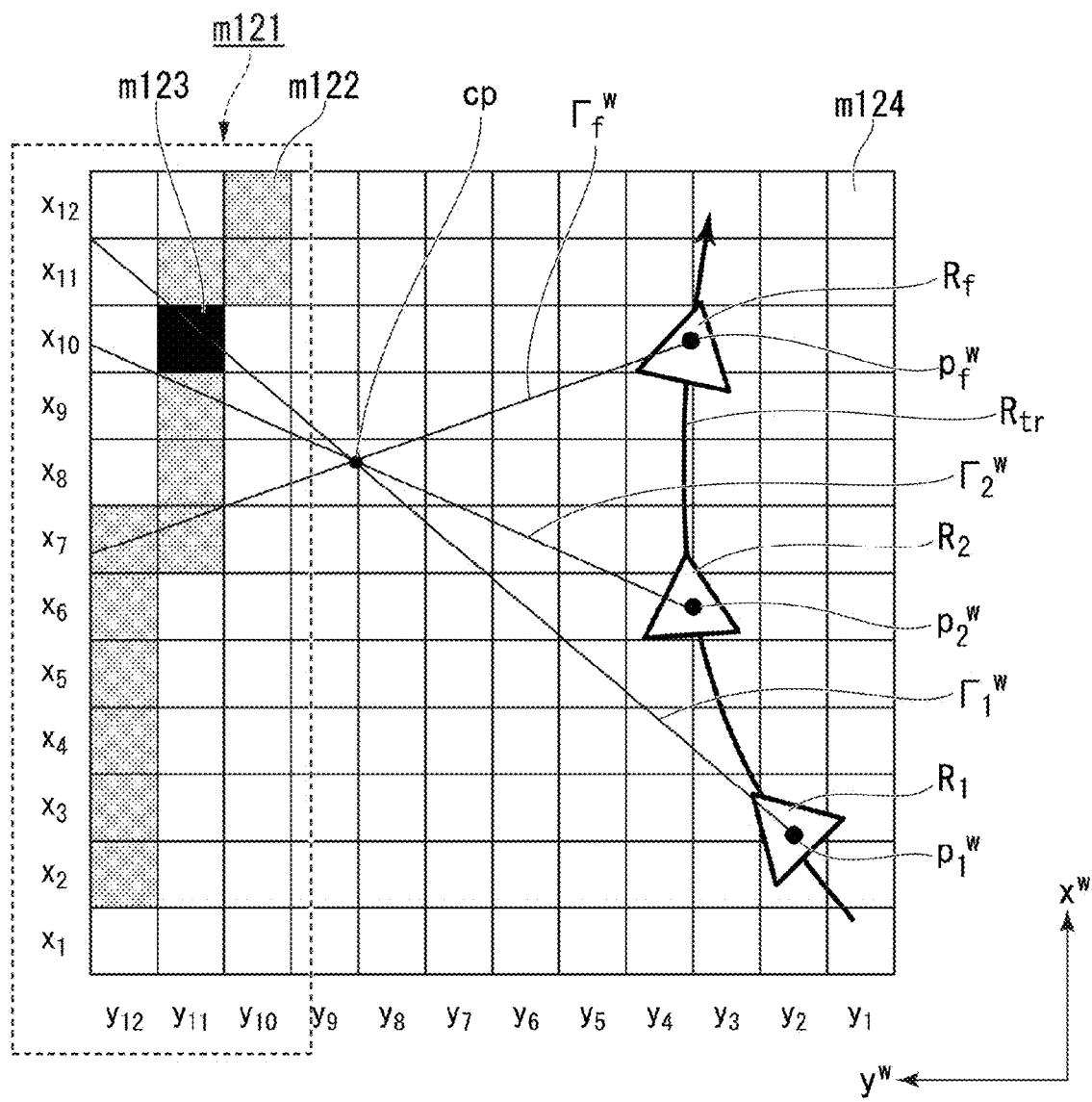
FIG. 9 is a diagram for describing a reflection detection model according to the present embodiment.

FIG. 9 is a diagram for describing a reflection detection model according to the present embodiment. In the example shown in FIG. 9, the sound source is not moving. The sound source is at the location of reference symbol cp.

The coordinate system of FIG. 9 is the world coordinate system $C^w$. The traveling direction of the robot 1 (vertical direction on the paper) is the $x^w$ axis direction, and the left-right direction of the robot 1 (left-right direction on the paper) is the $y^w$ axis direction. Reference symbol $R_f$ denotes the robot 1 at the f-th frame. Moreover, reference symbol $p_f^w$ denotes the location (coordinate) of the robot 1 at the f-th frame in the world coordinate system $C^w$. The diagram of the region of reference symbol m121 shows the grid that is estimated as being an obstacle (such as a wall) based on the map information. Moreover, the dot-patterned grid (such as m122) shows the grid where the space is obstructed by an obstacle, and the black grid m123 shows the grid where the space at the first frame is obstructed by an obstacle. The white grid (such as m124) shows the free space where no obstacle is present).

The second sound source localization unit 70 defines the line segment $\Gamma_f^w$ toward the sound source direction as the following equation (15), using the f-th frame sound source direction angle $\psi_f^r$ estimated by the first sound source localization unit 20, and the f-th frame self-location information $P_f^w$ input from the first map information generation unit 50. The relationship between the robot coordinate system $C^r$ and the world coordinate system $C^w$ is the relationship described in FIG. 6.

$$\Gamma_f^w(x^w, y^w) = \cos(\psi_f^r + \theta_f^w)(y^w - y_f^w) - \sin(\psi_f^r + \theta_f^w)(x^w - x_f^w) \quad (15)$$
$$= 0$$

In the equation (15), $x_f^w$ is the x coordinate at the f-th frame in the world coordinate, and $y_f^w$ is the y coordinate at the f-th frame in the world coordinate. The meaning of the equation (15) is an equation of a straight line with a slope $\psi_f^r + \theta_f^w$ that passes the point $(x_f^w, y_f^w)$.

As shown in FIG. 9, the second sound source localization unit 70 calculates the line segment $\Gamma_f^w$ at every f frames in the world coordinate system $C^w$, to thereby perform the second sound source localization at the f-th frame in the world coordinate system $C^w$. The second sound source localization unit 70 outputs, to the reflective object detection unit 80, the equation indicating the line segment $\Gamma_f^w$ that is generated from the estimated f-th frame localization result in the world coordinate system $C^w$.

<Reflective Object Detection>

The reflective object detection unit 80 receives input of two-dimensional map information from the first map information generation unit 50, and input of the equation indicating the line segment $\Gamma_f^w$ that is generated from the f-th frame localization result from the second sound source localization unit 70.

The reflective object detection unit 80 uses the input map information and the equation indicating the first frame line segment $\Gamma_1^w$ to thereby calculate the intersection point $\tilde{p}^{\sim w}$ (the following equation 16) between the first frame line segment $\Gamma_1^w$ and the grid. Here, the first frame may be a frame at a given time.

$$\tilde{p}^w = (\tilde{x}^w, \tilde{y}^w) \quad (16)$$

The intersection point in the grid is a predetermined location in the grid, and for example, it may be the center on the $y^w$ axis on the grid, and it may also be on the left side edge or right side edge in the $y^w$ axis direction on the grid.

Next, in the manner of the following equation (17), the reflective object detection unit 80 calculates two points, namely $p_-^{\sim w}$ $(x_-^{\sim w}, y_-^{\sim w})$ and $p_+^{\sim w}$ $(x_+^{\sim w}, y_+^{\sim w})$ in the vicinity of the calculated intersection point $\tilde{p}^{\sim w}$ on the line segment $\Gamma_1^w$.

$$\tilde{p}_\pm^w = p_1^w + (1 \pm \alpha)(\tilde{p}^w - p_1^w) \quad (17)$$

In the equation (17), $\alpha$ is a constant that is preliminarily defined by means of experiment. $\alpha$ may be a positive value in the vicinity of zero, and it may, for example, be decided according to the grid size. The grid size is, for example, 10 [cm]×10 [cm]. In the case where the intersection point $\tilde{p}^{\sim w}$ between the line segment $\Gamma_1^w$ and the grid m123 is the center of the $y_{11}$ of the $y^w$ axis for example, the two points in the vicinity may be on the right end and left end of the $y_{11}$ column where the grid m123 is present. For example, it is sufficient to be able to define whether those two points are on the outer side or inner side of $P_1^w$.

The reflective object detection unit 80 calculates the total of $d_-^{\sim W}$ and $d_+^{\sim w}$ of the distance from the two points calculated with the equation (17) to the F line segments $\Gamma_f^w$ (where f is not less than 1 and not more than F), using the following equation (18).

$$\tilde{d}_\pm^W = \sum_{f=1}^{F} |\cos(\psi_f^r + \theta_f^w)(y_\pm^w - y_f^w) - \sin(\psi_f^r + \theta_f^w)(x_\pm^w - x_f^w)| \quad (18)$$

The reflective object detection unit 80 determines, by means of the relationship between the calculated $d_-^{\sim W}$ and $d_+^{\sim w}$, whether the focus point cp (refer to FIG. 9) of the F line segments $\Gamma_f^w$ are on the inner side of the wall, which is the obstacle, or on the outer side of the wall.

If $d_-^{\sim W}$ is less than $d_+^{\sim w}$, the reflective object detection unit 80 determines the focus point cp formed by the F line segments as being on the inner side of the wall, and determines the localized sound as being a direct sound. On the other hand, in any case other than one where $d_-^{\sim W}$ is less than $d_+^{\sim w}$, the reflective object detection unit 80 determines the focus point cp formed by the F line segments as being on the outer side of the wall, and determines the localized sound as being a reflection. By rejecting the result of localization of the sound source that has been determined as a reflection, the reflective object detection unit 80 can obtain a robust sound source localization with respect to a reflection.

The reflective object detection unit 80 outputs, to the sound source direction determination unit 90, the information in which the sound source localization result indicates whether it is a direct sound or reflection.

<Sound Source Direction Determination>

Next is described a process performed by the sound source direction determination unit 90.

The sound source direction determination unit 90 determines the direction of sound source presence with respect to the true sound source, based on the sound source localization result input from the reflective object detection unit 80. For example, in the example shown in FIG. 7, the sound source direction determination unit 90 determines the direction of reference symbol Sf as being the direction of the true sound source. In this case, the sound source direction determination unit 90 outputs, to the action generation unit 110, $\psi_f^w$, which is the result of converting the direction angle $\psi_f^r$, which is the f-th frame estimation result estimated by the first sound source localization unit 20, into the world coordinate system $C^w$.

On the other hand, in the example shown in FIG. 8, the sound source direction determination unit 90 determines the direction of reference symbol Sf as being the direction of the true sound source. In this case, since the direction angle $\psi_f^r$, which is the f-th frame estimation result estimated by the first sound source localization unit 20, is a mirror image by the reflection, the sound source direction determination unit 90 calculates the direction angle $\psi_f^r$ of the true sound source, based on the estimated direction angle $\psi_f^r$ and the wall location. Then, the sound source direction determination unit 90 outputs, to the action generation unit 110, $\psi_f^w$, which is the result of converting the calculated direction angle $\psi_f^r$ of the true sound source into the world coordinate system $C^w$.

<Action Generation Unit Process>

Next, an example of a process performed by the action generation unit 110 is described.

The first action generation unit 111 generates an action path of the robot 1 shown with reference symbol Rtr in FIG. 7 and FIG. 8, based on the inputs of the self-location information $p_f^w$, the sound source direction angle $\psi_f^w$, and the cost map information. For example, in the example shown in FIG. 7, since the estimated sound source is the true sound source, the first action generation unit 111 generates an action path Rtr so as to approach the sound source St.

On the other hand, in the example shown in FIG. 8, the first action generation unit 111 generates an action path Rtr so as to approach the true sound source St determined by the sound source direction determination unit 90. As a result, even in the case where direct sound cannot be acquired due to the wall Wc, the robot 1 can move toward the location of the true sound source.

The second action generation unit 112 generates an action plan of the robot 1 for avoiding the obstacle, based on the inputs of the self-location information $p_f^w$ and the cost map information. For example, in the example shown in FIG. 7 or FIG. 8, the second action generation unit 112 generates an action plan so that the robot 1 will not collide with the walls Wall1 and Wall2. Moreover, in the example shown in FIG. 8, since there is a wall Wall1 in the direction in which a sound source is estimated as being present by the first sound source localization unit 20 while the estimated sound source is a mirror image, and there is the wall Wall1 in the direction of the mirror image, the second action generation unit 112 generates an action plan so as not to collide with the wall Wall1.

Here, in the example shown in FIG. 8, in a case where there is a true sound source at the location indicated with reference symbol Sf, the first action generation unit 111 generates an action path Rtr so that the robot 1 will approach the true sound source. However, since the sound source direction determination unit 90 determines the true sound source as being on the far side of the wall Wall1 and the second action generation unit 112 generates an action plan based on the fact of the wall Wall1 being present in the true sound source presence direction, the robot 1 can avoid collision with the wall Wall1.

Next, an example of a process performed by the robot 1 is described.

Figure 10:
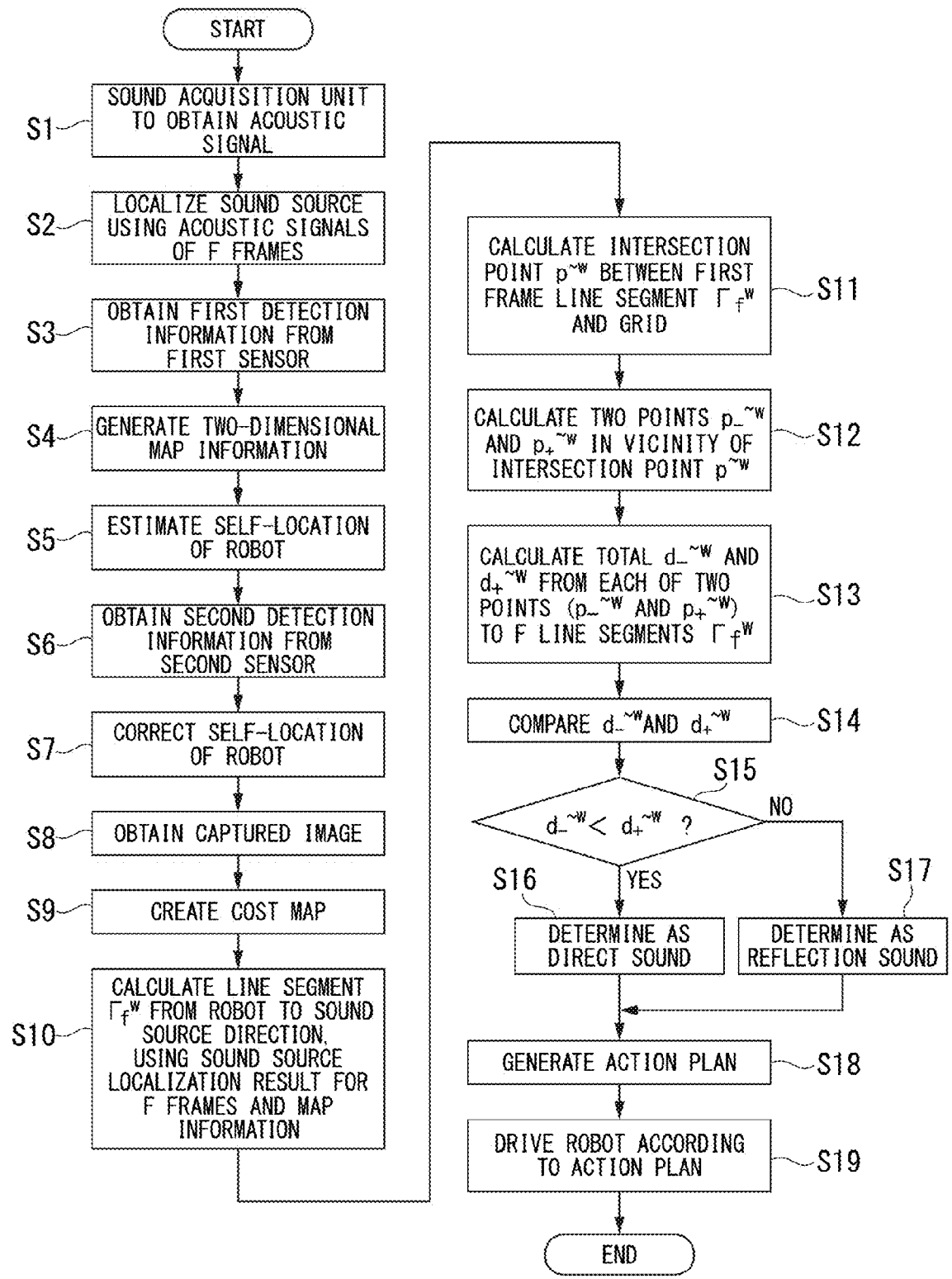
FIG. 10 is a flowchart of a process performed by the robot according to the first embodiment.

FIG. 10 is a flowchart of a process performed by the robot 1 according to the present embodiment.

(Step S1) The sound acquisition unit 10 acquires acoustic signals of M channels, and transmits the acquired acoustic signals of M channels to the first sound source localization unit 20.

(Step S2) The first sound source localization unit 20 uses each of the M acoustic signals of F frames acquired by the sound acquisition unit 10, to thereby estimate the direction angle $\psi_f^r$, which is the sound source direction at the f-th frame, by means of the MUSIC method, and beam forming method or the like, using the stored transfer function A.

(Step S3) The first sensor 30 detects the distance from and direction of an object, for example, by scanning a detection target space at a predetermined pitch while emitting laser light and measuring the length of time that it takes to return after having been reflected on the object. The first sensor 30 outputs by a wireless or wired means, to the first map information generation unit 50, the information including the detected distance from and direction of the object as first detection information.

(Step S4) The two-dimensional map information generation unit 52, by means of the Hector SLAM method for example, generates two-dimensional map information, using the first detection information input from the first sensor 30.

(Step S5) The two-dimensional self-location estimation unit 51, for example, by means of the Hector SLAM method, estimates the location and inclination of the robot itself in the global coordinate system, using the first detection information input from the first sensor 30.

(Step S6) The second sensor 40 detects a three-dimensional angular velocity and acceleration, by means of a three-axis gyro and three-direction accelerometer for example, and outputs the detected detection result to the first map information generation unit 50 as second detection information. Next, the correction unit 53 obtains the second detection information input from the second sensor 40.

(Step S7) The correction unit 53 corrects the self-location estimated by the two-dimensional self-location estimation unit 51, using the second detection information input from the second sensor 40.

(Step S8) The image capturing unit 60 captures an image at predetermined intervals, and outputs the captured image information to the cost map unit 100. Next, the cost map unit 100 obtains image information input from the image capturing unit 60.

(Step S9) The cost map unit 100 integrates the two-dimensional map information input from the first map information generation unit 50 with the image information input from the image capturing unit 60, and generates three-dimensional map information, which is a cost map.

(Step S10) The second sound source localization unit 70 calculates the line segment $\Gamma_f^w$ toward the sound source direction with use of the equation (15) at each frame, using the f-th frame sound source direction angle $\psi_f^r$ estimated by the first sound source localization unit 20, and the f-th frame self-location information $P_f^w$ input from the first map information generation unit 50.

(Step S11) The reflective object detection unit 80 uses the input map information and the equation indicating the first frame line segment $\Gamma_1^w$ to thereby calculate the intersection point $p^{\sim w}$ between the first frame line segment $\Gamma_1^w$ and the grid, using the equation (16).

(Step S12) Next, using the equation (17), the reflective object detection unit 80 calculates two points, namely $p_-^{\sim w}$ ($x_-^{\sim w}$, $y_-^{\sim w}$) and $p_+^{\sim w}$ ($x_+^{\sim w}$, $y_+^{\sim w}$) in the vicinity of the calculated intersection point $p^{\sim w}$ on the line segment $\Gamma_1^w$.

(Step S13) The reflective object detection unit 80 calculates the total of $d_-^{\sim w}$ and $d_+^{\sim w}$ of the distance from the two points calculated in step S12 to the F line segments $\Gamma_f^w$ (where f is not less than 1 and not more than F), using the equation (18).

(Step S14) The reflective object detection unit 80 determines, by means of the relationship between the calculated $d_-^{\sim w}$ and $d_+^{\sim w}$, whether the focus point of the F line segments $\Gamma_f^w$ are on the inner side of the wall, which is the obstacle, or on the outer side of the wall.

(Step S15) The reflective object detection unit 80 proceeds to step S16 if $d_-^{\sim w}$ is less than $d_+^{\sim w}$ (step S15; YES), and proceeds to step S17 if $d_-^{\sim w}$ is not less than $d_+^{\sim w}$ (step S15; NO).

(Step S16) The reflective object detection unit 80 determines the focus point formed by the F line segments as being on the inner side of the wall, and determines the localized sound as being a direct sound. The reflective object detection unit 80 causes the process to proceed to step S18.

(Step S17) The reflective object detection unit 80 determines the focus point formed by the F line segments as being on the outer side of the wall, and determines the localized sound as being a reflection. The reflective object detection unit 80 causes the process to proceed to step S18.

(Step S18) The action generation unit 110 generates an action plan of the robot 1, based on the inputs of the self-location information $p_f^w$, the sound source direction angle $\psi_f^w$, and the cost map information generated by the cost map unit 100.

(Step S19) The driving control unit 120 generates driving signals for controlling operations of the robot 1 according to the action plan input from the action generation unit 110, and outputs the generated driving signals to the driving unit 130. Next, the driving unit 130 drives wheels or the like installed in the base 1001 (refer to FIG. 2), according to the driving signal input from the driving control unit 120.

The robot 1 repeats the above processes at predetermined temporal intervals for example.

The driving control unit 120 may perform control so that the moving speed of the robot 1 is faster when the sound source St is on the inner side of the wall (on the robot 1 side) than when the sound source is on the outer side of the wall. That is to say, in the case where the sound source localization result is a direct sound, the robot 1 is moved toward the direction (second direction), and accordingly, the robot 1 can be moved, for example, at a speed of 0.5 [m/s]. On the other hand, in the case where the localized sound source is on the far side of the wall, there is a possibility that the robot 1 may collide with the wall if it travels toward the localized direction. Therefore, based on the map information, the robot 1 is moved toward the direction (first direction) that will not cause a collision with the wall, while the robot 1 detects a reflective object. As a result of this, as for the moving speed of the robot 1, the robot 1 may be moved, for example, at a speed lower than 0.5 [m/s] so as to avoid the obstacle.

<Experiment Result>

Next is described an example of the result of an experiment performed with use of the robot 1 of the present embodiment.

Figure 11:
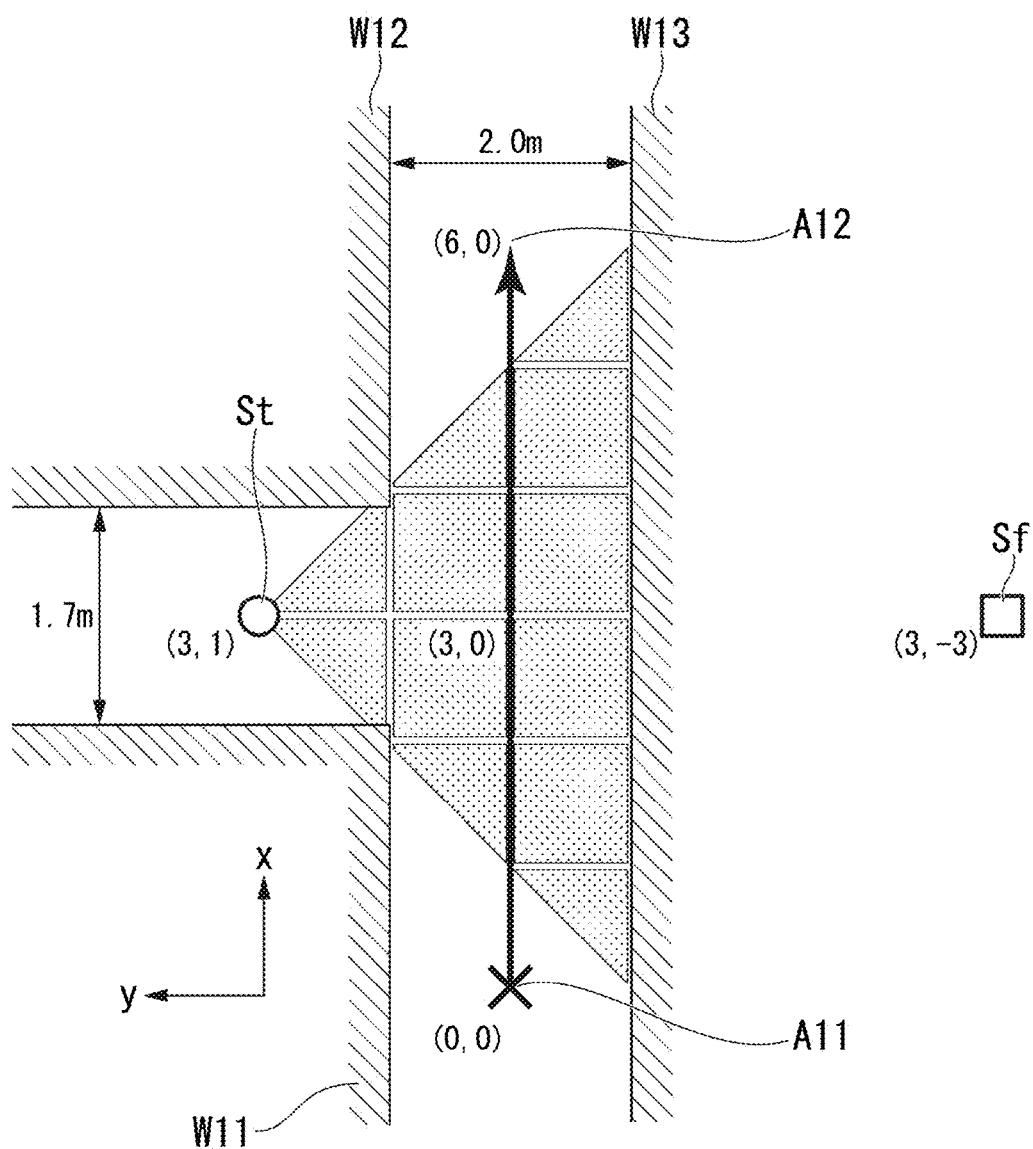
FIG. 11 is a top view of a passage 1 used in an experiment.
Figure 12:
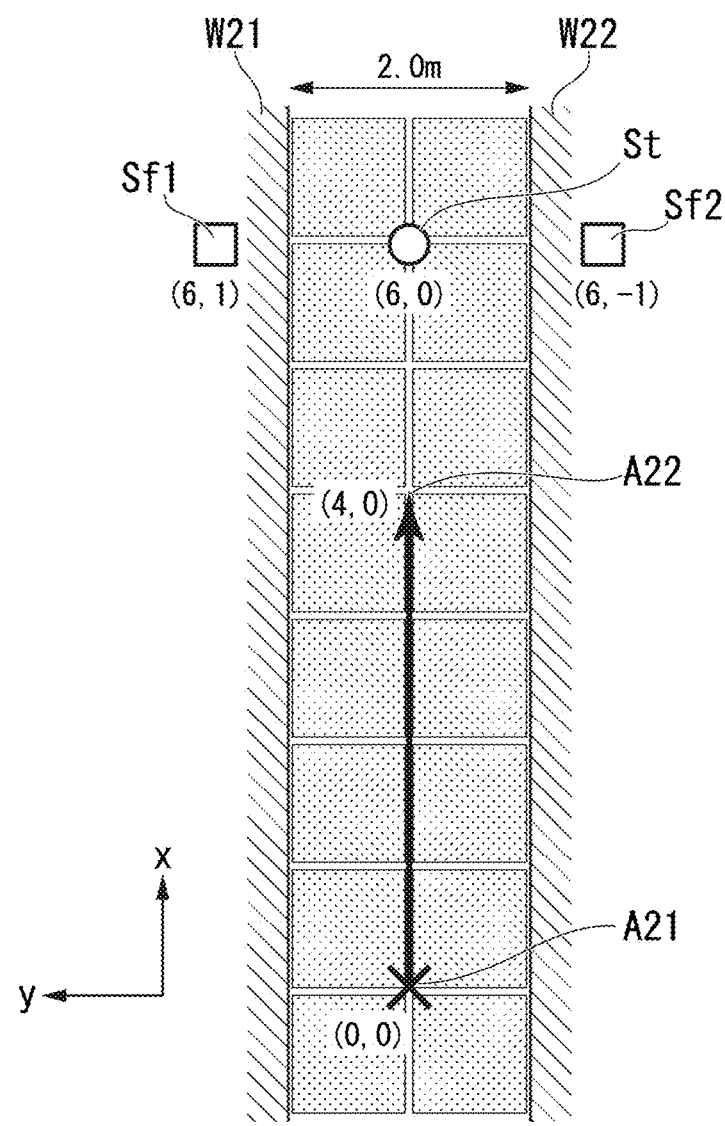
FIG. 12 is a top view of a passage 2 used in an experiment.

FIG. 11 is a top view of a passage 1 used in the experiment. FIG. 12 is a top view of a passage 2 used in the experiment. In FIG. 11 and FIG. 12, the traveling direction of the robot 1 is the x axis direction, and the left-right direction of the robot 1 is the y axis direction. Moreover, the reverberation time (RT20) of the passage shown in FIG. 11 and FIG. 12 is 0.4 [seconds].

The passage 1 shown in FIG. 11 is a passage having a T junction, and there are walls W11 and W12 on the left side thereof, and there is a wall W13 on the right side thereof. The T junction is formed by the walls W11 and W12 as shown in FIG. 11. The width of the T junction formed by the walls W11 and W12 is 1.7 [m]. Moreover, the width between the wall W13 and the wall W11 or the wall W12 is 2.0 [m]. Specifically, the passage 1 and the passage 2 are regions that are part of a hallway.

Moreover, in FIG. 11, the location shown with reference symbol A11 is the movement start location of the robot 1.

The coordinate of this movement start location is (0, 0). The location shown with reference symbol A12 where the coordinate is (6, 0) is the movement end location of the robot 1. According to the action plan, the robot 1 moves from the movement start location A11 to the movement end location A12 via the halfway location (coordinate (3, 0).

The sound source St is arranged at the coordinate (3, 1) within the T junction. The location of the sound source St is fixed. Moreover, reference symbol Sf denotes a mirror image of the sound source St, and it emerges at the location with coordinate (3, −3), which is line symmetric with respect to the true sound source St about the wall W13.

In the example shown in FIG. 11, the robot 1 is unable to acquire direct sound of the sound source St while it is approximately between coordinates (0, 0) and (1, 0), and approximately between the coordinates (5, 0) and (6, 0). The robot 1 is able to acquire direct sound of the sound source St while it is approximately between coordinates (2, 0) and (5, 0).

The passage 2 shown in FIG. 12 is a substantially linear passage between the left side wall W21 and the right side wall W22. The width between the wall W21 and the wall W22 is 2.0 [m]. In FIG. 11, and FIG. 12, the walls (W11 to W13, W21, and W22) are glass walls that are likely to reflect sound.

Moreover, in FIG. 12, the location shown with reference symbol A21, the coordinate of which is (0, 0), is the movement start location of the robot 1. The location shown with reference symbol A22 where the coordinate is (4, 0) is the movement end location of the robot 1. According to the action plan, the robot 1 moves from the movement start location A21 to the movement end location A22 via the halfway location (coordinate (2, 0). The sound source St is arranged at the coordinate (6, 0) within the passage between the wall W21 and the wall W22. The location of the sound source St is fixed. Moreover, reference symbol Sf1 denotes a mirror image of the sound source St, and it emerges at the location with coordinate (6, 1), which is line symmetric with respect to the true sound source St about the wall W21. Reference symbol Sf2 denotes a mirror image of the sound source St, and it emerges at the location with coordinate (6, −1), which is line symmetric with respect to the true sound source St about the wall W22.

In the example shown in FIG. 12, the robot 1 is able to acquire direct sound of the sound source St while it is present between the movement start location A11 and the movement end location A12. However, it also acquires reflection because the walls are glass walls.

The sound acquisition unit 10 used in the experiment is provided with seven microphones. Moreover, in the passage 1 shown in FIG. 11 and the passage 2 shown in FIG. 12, this sound acquisition unit 10 was used to preliminarily measure the transfer function A ($\omega$, $\psi'$) at 5 degree intervals. Also, the first sound source localization unit 20 performed sampling on the acquired acoustic signals at a sampling frequency of 16 [kHz] and a quantization bit rate of 16 [bit]. Moreover, the window length and shift length of short-time Fourier transform were 512 and 160 samples respectively. Also, the first sound source localization unit 20 performed a sound source localization process by means of the MUSIC method.

In the experiment, in FIG. 11, the robot 1 was moved from the movement start location A11 to the movement end location A12 five times, and an average error of the angle at the T junction was calculated. In the case of the T junction, the angular deviation from 1.57 [rad] (90 degrees) was calculated at each frame.

Moreover, in FIG. 12, the robot 1 was moved from the movement start location A21 to the movement end location A22 five times, and an average error of the distance was calculated.

As shown in FIG. 11 and FIG. 12, the robot 1 is distanced from the walls (W11 to W13, W21, and W22) by 1 [m] respectively. The average error was found in a manner such that the experimenter calculated deviation in the normal line direction at each frame and calculated the average thereof.

FIG. 13 is a diagram for describing the results of measurements performed in the passage 1 including the T-junction. FIG. 14 is a diagram for describing the results of measurements performed in the passage 2. In FIG. 13 and FIG. 14, the vertical axis represents average error [rad], and the horizontal axis represents the number of trials [ordinal number].

In FIG. 13, the images denoted with reference symbols g11 to g15 represent average errors at each trial occasion according to the present embodiment, and the images denoted with reference symbols g21 to g25 represent average errors at each trial occasion according to a comparative example. Moreover, in FIG. 14, the images denoted with reference symbols g31 to g35 represent average errors at each trial occasion according to the present embodiment, and the images denoted with reference symbols g41 to g45 represent average errors at each trial occasion according to a comparative example. Here, the comparative example did not use the measurement results of the second sensor 40 to perform self-location correction, but used the Hector SLAM method to perform map information creation and self-location estimation.

As shown in FIG. 13, in the passage 1 including the T junction (FIG. 11), the average value of the average errors in five trials with the method of the present embodiment was 0.026 [rad], and the average value of the average errors in five trials of the comparative example was 0.073 [rad].

Moreover, as shown in FIG. 14, in the passage 2 including the T junction (FIG. 12), the average value of the average errors in five trials with the method of the present embodiment was 0.058 [rad], and the average value of the average errors in five trials of the comparative example was 0.150 [rad].

As shown with the experiment results illustrated in FIG. 13 and FIG. 14, the present embodiment was able to reduce average errors, regardless of distance and angle, by approximately 50 to 70 [%] compared to the comparative example.

Next is described an example of the result of measuring sound source localization performance of the robot 1 under a reverberant environment, with respect to the presence of the reflective object detection unit 80. The measurement environment is illustrated in FIG. 11 and FIG. 12. The robot 1 was moved from the movement start location to the movement end location in the environment at a speed of 0.5 [m/s], and the sound source localization process was performed at 50 [ms] intervals. The observer calculated the frame accuracy rate (the number of frames at which correct direction localization was performed where acceptable error was 5 [deg]).

FIG. 15 is a diagram for describing an example of the results of measurements related to sound source localization.

In FIG. 15, the number of frames, at which sound source localization was performed, differ between the passage 1 and the passage 2 while the movement distances of the robot 1 were the same. The reason for this is that when the robot 1 is actually moved from the movement start location to the movement end location, an error is present in the moving speed due to the control.

In the passage 1, the frame accuracy rate in the case of performing the sound source localization process without using the reflective object detection unit 80 was 84.1 [%], and the frame accuracy rate in the case of performing the sound source localization process with use of the reflective object detection unit 80 was 92.5 [%].

Furthermore, in the passage 2, the frame accuracy rate in the case of performing the sound source localization process without using the reflective object detection unit 80 was 42.4 [%], and the frame accuracy rate in the case of performing the sound source localization process with use of the reflective object detection unit 80 was 49.4 [%].

As seen above, in the passage 1 and passage 2, in sound localization including reflection, the frame accuracy rate was improved by 7 to 8 [%] according to the present embodiment.

Next is described an example of the result of measurements in which the cost map unit 100 projected a three-dimensional image captured based on the image captured by the image capturing unit 60, on two-dimensional map information.

Figure 16:
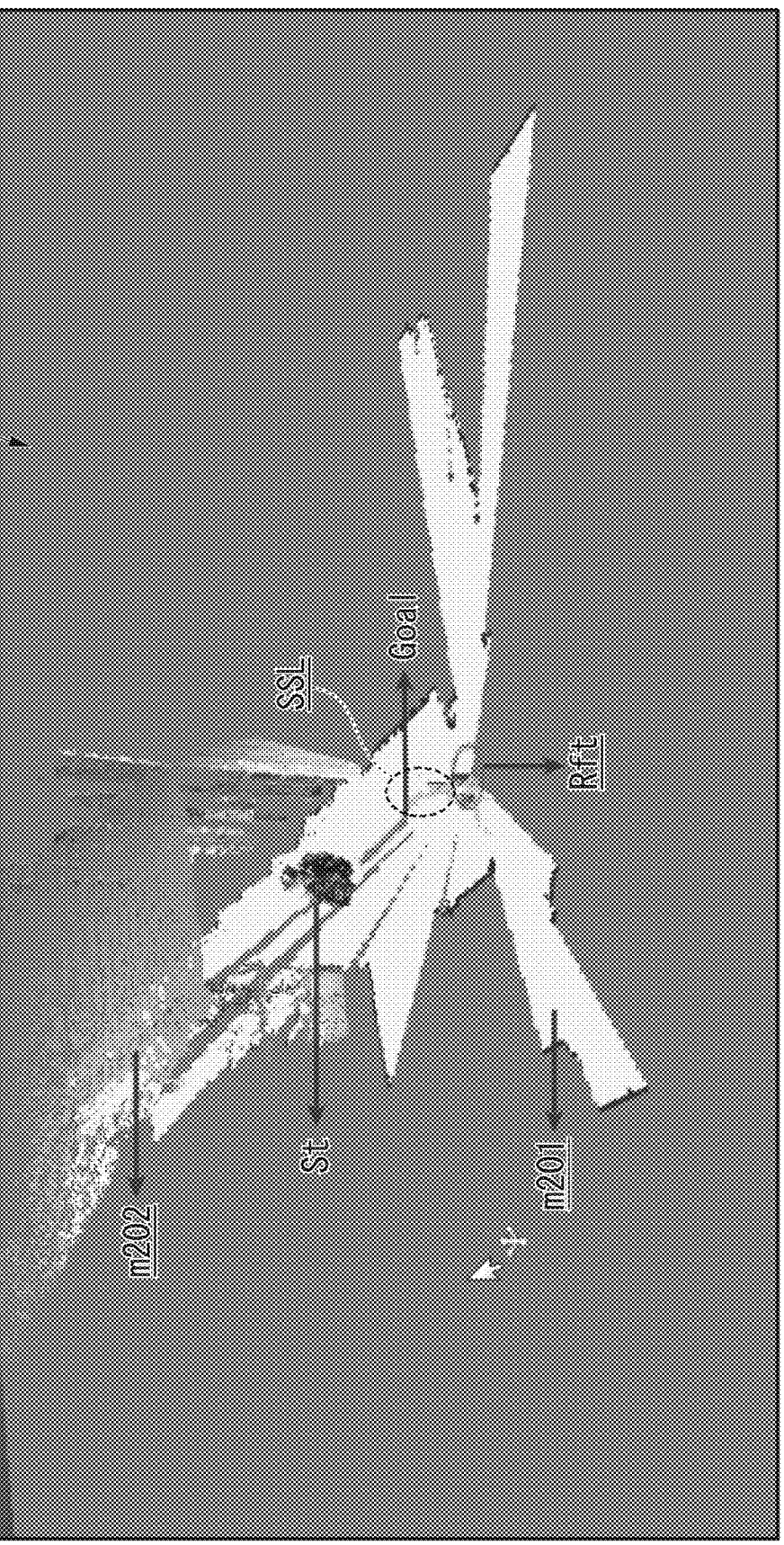
FIG. 16 is a diagram for describing an example of the result of measurements in which a three-dimensional image captured by an image capturing unit 60 is projected on the two-dimensional map information according to the first embodiment.

FIG. 16 is a diagram for describing the example of the result of measurements in which a three-dimensional image captured by the image capturing unit 60 is projected on the two-dimensional map information according to the present embodiment.

In FIG. 16, reference symbol St denotes a sound source, the image of a region shown with reference symbol m201 shows two-dimensional map information, and the image of a region shown with reference symbol m202 shows a three-dimensional image captured by the image capturing unit 60. Moreover, the image of a region shown with reference symbol m203 is an image of a region for which map information has not been created. The image of a region shown with reference symbol Rft is an image showing the path through which the robot 1 has moved.

In the example shown in FIG. 16, there is a situation where a human (sound source St) is talking in front of the robot 1.

The image of a region shown with reference symbol SSL is an image showing the result of the robot 1 having performed the sound source localization process. As seen with the image of the region with reference symbol SSL, it is shown that the robot 1 has correctly performed localization in the direction of the sound source St.

As described above, the autonomous action robot (such as robot 1) of the present embodiment is provided with: a sound acquisition unit (such as sound acquisition unit 10) that acquires acoustic signals; a sound source localization unit (such as first sound source localization unit 20) that estimates the direction of a sound source with respect to the acoustic signal, using the acquired acoustic signal; a distance measurement unit (such as first sensor 30) that performs measurements related to distance for a predetermined range; a map information generation unit (such as first map information generation unit 50) that generates two-dimensional map information and that estimates a self-location of the autonomous action robot, using information of the distance; a sound source direction determination unit (such as second sound source localization unit 70, reflective object detection unit 80, and sound source direction determination unit 90) that re-estimates the direction of the sound source by determining whether the acoustic signal is a reflection reflected from a reflective object or a direct sound from the sound source, based on the two-dimensional map information, the estimated self-location information, and the estimated sound source direction; an action generation unit (such as action generation unit 110) that generates an action plan for moving toward a first direction if the acoustic signal is determined as a reflection and that generates an action plan for moving toward a second direction that differs from the first direction if the acoustic signal is determined as a direct sound, based on the two-dimensional map information and the sound source direction estimated by the sound source direction determination unit; and a control unit that controls the autonomous action robot according to the action plan.

With this configuration, the robot 1 of the present embodiment can determine whether an acquired acoustic signal is a direct sound or a reflection, based on the acquired acoustic signal and map information. Then the robot 1 of the present embodiment can be moved toward the first direction if a direct sound cannot be acquired from the position where the robot 1 is present, and the robot 1 can be moved toward the second direction which different from the first direction, if a direct sound can be acquired from the position where the robot 1 is present. As a result, according to the present embodiment, the robot 1 can be moved smoothly.

Moreover, in the autonomous action robot (such as robot 1) of the present embodiment, the second direction is a direction that is oriented toward the sound source more than the first direction.

With this configuration, even in a case where acoustic signals cannot be acquired directly from the sound source due to a wall and so forth, the robot 1 of the present embodiment performs sound source localization, using reverberant sound, and determines whether the sound source that has been localized is a direct sound or a reflection. As a result, according to the present embodiment, the robot 1 can act according to the determination results, and therefore, the robot 1 can be moved smoothly toward the sound source direction.

Moreover, in the autonomous action robot of the present embodiment, there is provided a detection unit (such as second sensor 40) that detects angular velocity and acceleration of the autonomous action robot, and the map information generation unit (such as first map information generation unit 50) corrects the estimated self-location, using detection results detected by the detection unit.

With this configuration, the robot 1 of the present embodiment is able to reduce distance estimation errors and angle estimation errors even in those cases where the floor surface or ground surface on which the robot 1 travels is an irregular surface, compared to the case where only an LRF, which is a distance sensor, is used to generate a map and estimate the self-location.

Moreover, in the autonomous action robot of the present embodiment, the sound source direction determination unit (such as second sound source localization unit 70, reflective object detection unit 80, and sound source direction determination unit 90): calculates a line segment that shows a relationship between the estimated self-location and an obstacle at each frame, using the sound source direction localized by the sound source localization unit (such as first sound source localization unit 20) and the estimated self-location that indicates the self-location estimated by the map information generation unit (such as first map information generation unit 50); calculates an intersection point between the line segment and the obstacle at a given frame; calculates two points in the vicinity of the calculated intersection point on the line segment at the given frame; calculates a total distance from the calculated two points to the line segment at an f-th frame (where f is an integer not less than 2); and determines whether the acoustic signal is a direct sound or a reflection based on the calculated results.

With this configuration, the robot 1 of the present embodiment is able to determine whether the estimated acoustic signal is a direct sound or a reflection, using the sound source direction localized by the sound source localization unit and information showing the self-location estimated by the map information generation unit. In the present embodiment, according to this determination result, the autonomous action robot can be moved smoothly toward the sound source direction.

Furthermore, in the autonomous action robot of the present embodiment, the moving speed when progressing toward the second direction is faster than that at the time of progressing toward the first direction.

With this configuration, the robot 1 of the present embodiment is such that according to the type of acquired acoustic signal, the moving speed of the robot 1 can be changed, and therefore, the robot can be moved smoothly toward the sound source direction.

In the present embodiment, an example has been described in which the first map information generation unit 50 generates two-dimensional map information based on the first detection information detected by the first sensor 30. However, it is not limited to this.

For example, the first map information generation unit 50 may determine an obstacle such as a wall by obtaining an image captured by the image capturing unit 60 and performing image recognition on the obtained image by means of a commonly known method, to thereby generate the grid map information shown in FIG. 4.

Moreover, in the present embodiment, an example has been described in which the action generation unit 110 generates an action plan so as to cause the robot 1 to avoid an obstacle and move toward the sound source direction. However, it is not limited to this.

For example, the feature value of the acoustic signal acquired by the sound acquisition unit 10 may be extracted, and the type of the acoustic signal may be estimated. Then, if the estimated acoustic signal is a preliminarily defined sound such as a warning sound, the action generation unit 110 may generate an action plan so as not only to cause the robot 1 to move toward the direction of the sound source, but also to cause it to control the arm unit to perform a predetermined operation. In this case, the driving unit 130 may also drive the left arm 1003 (including the hand unit), the right arm 1004 (including the hand unit), and the head unit 1005.

Second Embodiment

Figure 17:
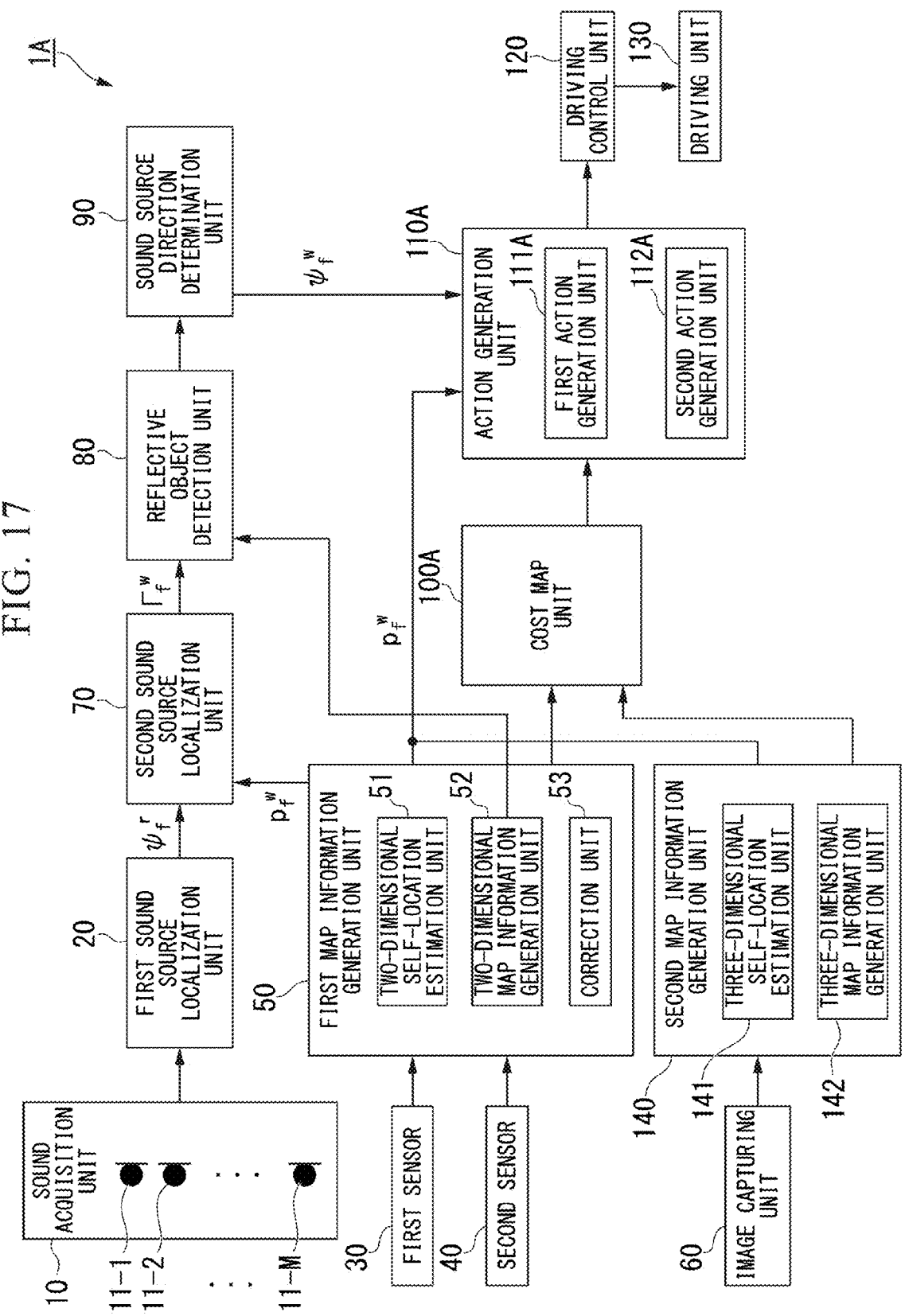
FIG. 17 is a block diagram showing a configuration of an autonomous action robot according to a second embodiment.

FIG. 17 is a block diagram showing a configuration of an autonomous action capable robot 1A according to the present embodiment. As shown in FIG. 17, the robot 1A includes: a sound acquisition unit 10; a first sound source localization unit 20; a first sensor 30 (distance measurement unit); a second sensor 40 (detection unit); a first map information generation unit 50 (map information generation unit); an image capturing unit 60; a second sound source localization unit 70 (sound source direction determination unit); a reflective object detection unit 80 (sound source direction determination unit); a sound source direction determination unit 90; a cost map unit 100A; an action generation unit 110A; a driving control unit 120; a driving unit 130; and a second map information generation unit 140 (map information generation unit). Those function units having the same functions as those of the robot 1 of the first embodiment (FIG. 1) are given the same reference symbols, and descriptions thereof are omitted.

The image capturing unit 60 captures an image at predetermined intervals, and outputs the captured image information to the second map information generation unit 140. The image capturing unit 60 is an RGB-D camera for example. Here, an RGB-D camera is a camera that is capable of obtaining depth images in addition to RGB images. Furthermore, the image capturing unit 60 may be a stereo camera comprising two cameras.

The second map information generation unit 140 is provided with a three-dimensional self-location estimation unit 141 (global 3D self-localization), and a three-dimensional map information generation unit 142 (global 3D occupancy grid map).

The three-dimensional self-location estimation unit 141 and the three-dimensional map information generation unit 142 simultaneously perform generation of three-dimensional map information and self-location estimation, by means of a three-dimensional SLAM method (3D SLAM; for example, refer to Reference Literatures 3 to 5).

Reference Literature 3: A. Huang et al., "Visual Odometry and Mapping for Autonomous Flight Using an RGB-D Camera", in Proc. of Int. Symposium on Robotics Research (ISRR), 2011

Reference Literature 4: F. Endres et al., "An Evaluation of the RGB-D SLAM System", in Proc. of the IEEE Int. Conf. on Robotics and Automation (ICRA), pp. 1691-1696, 2012

Reference Literature 5: I. Dryanovski, R. G. Valenti, J. Xiao, "Fast Visual Odometry and Mapping from RGB-D Data", in Proc. of the IEEE Int. Conf. on Robotics and Automation (ICRA), pp. 2305-2310, 2013

The three-dimensional self-location estimation unit 141, by means of the three-dimensional SLAM method, estimates a three-dimensional position ($x_f^w$, $y_f^w$, $z_f^w$) in the robot coordinate system and direction angles (roll, pitch, and yaw), using the image input from the image capturing unit 60, and outputs the estimation result to the action generation unit 110A. In the present embodiment, an example has been described in which the second map information generation unit 140 is provided with a three-dimensional self-location estimation unit 141 and a three-dimensional map information generation unit 142. However, it is not limited to this. The second map information generation unit 140 may not have to be provided with a three-dimensional self-location estimation unit 141. In this case, location estimation may use only the result estimated by the two-dimensional self-location estimation unit 51.

Figure 18:
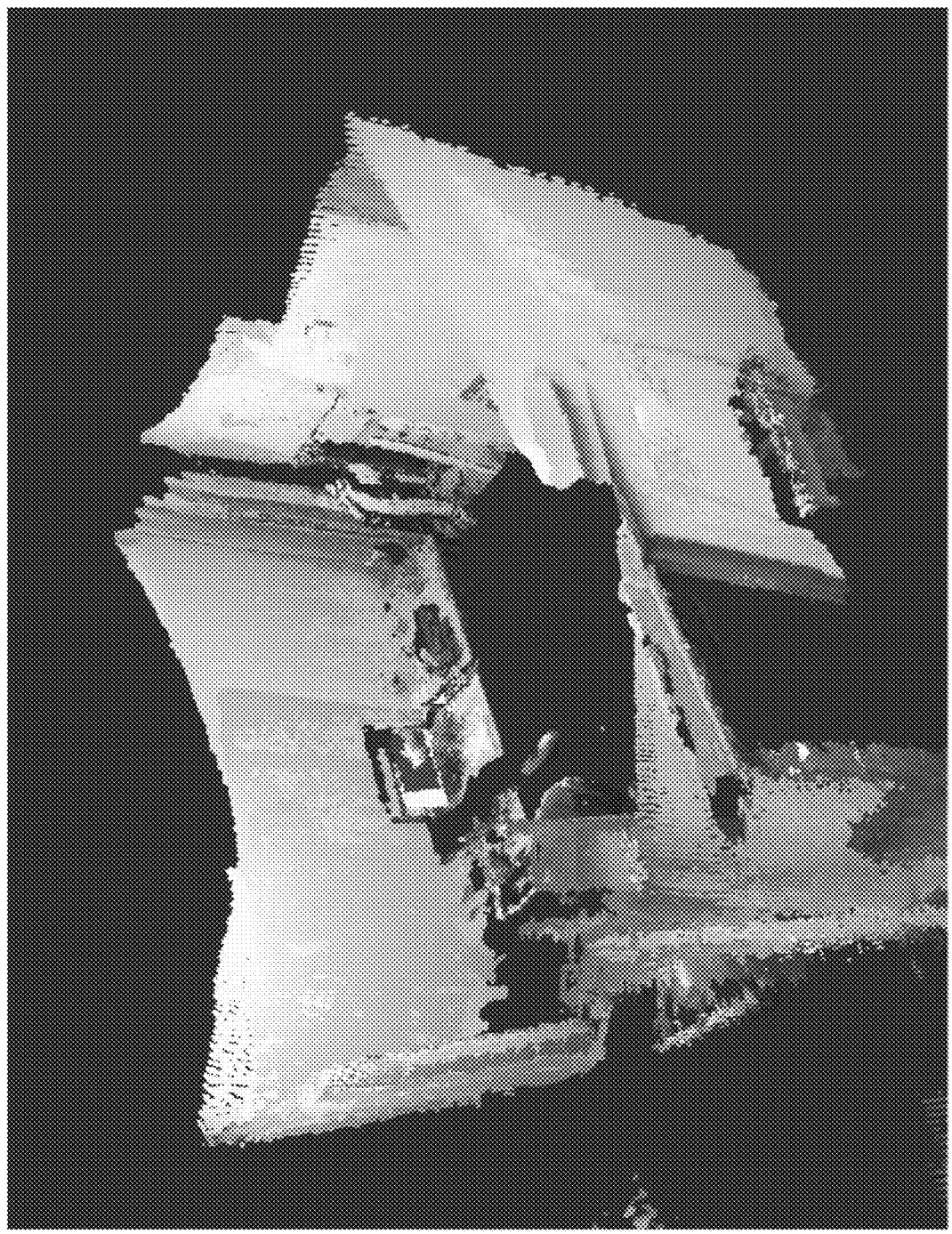
FIG. 18 is a diagram for describing an example of a three-dimensional map generated by means of a three-dimensional SLAM method.

The three-dimensional map information generation unit 142, by means of the three-dimensional SLAM method, generates three-dimensional map information as shown in FIG. 18, using the image input from the image capturing unit 60, and outputs the generated three-dimensional map information to the cost map unit 100A. FIG. 18 is a diagram for describing an example of a three-dimensional map generated by means of the three-dimensional SLAM method. However, in the present embodiment, three-dimensional map information generated by the three-dimensional map information generation unit 142 is of a predetermined range from the robot 1A at each frame, as with FIG. 5 of the first embodiment.

The cost map unit 100A receives input of two-dimensional map information from the first map information generation unit 50, and receives input of three-dimensional map information from the second map information generation unit 140. The cost map unit 100A integrates the input two-dimensional map information with the three-dimensional map information, and it generates map information as shown in FIG. 5 and outputs the generated map information to the action generation unit 110A.

The action generation unit 110A includes a first action generation unit 111A, and a second action generation unit 112A. The action generation unit 110A receives input of f-th frame self-location information $p_f^w$ from the first map information generation unit 50, receives input of f-th frame self-location information $p_f^w$ from the second map information generation unit 140, receives input of the direction angle $\psi_f^w$ of the sound source localization result from the sound source direction determination unit 90, and receives input of cost map information from the cost map unit 100A.

The action generation unit 110A primarily uses the map information generated by the first map information generation unit 50.

Moreover, in a case where a kidnapped robot problem occurs and the estimated self-location becomes significantly wrong while performing self-location estimation with use of the map information generated by the first map information generation unit 50, the action generation unit 110A re-sets the map information and self-location estimation information, using the f-th frame self-location information $p_f^w$ input from the second map information generation unit 140.

The first action generation unit 111A generates a first action plan, which is the action path of the robot 1, based on the self-location information $p_f^w$ input from the first map information generation unit 50, the sound source direction angle $\psi_f^w$, and the cost map information.

The second action generation unit 112A generates a second action plan of the robot 1 for avoiding an obstacle, based on the self-location information $p_f^w$ and the cost map information.

The action generation unit 110A integrates the generated first action plan and second action plan to generate an action plan, and outputs information indicating the generated action plan to the driving control unit 120.

Next, an example of a process performed by the robot 1A is described.

Figure 19:
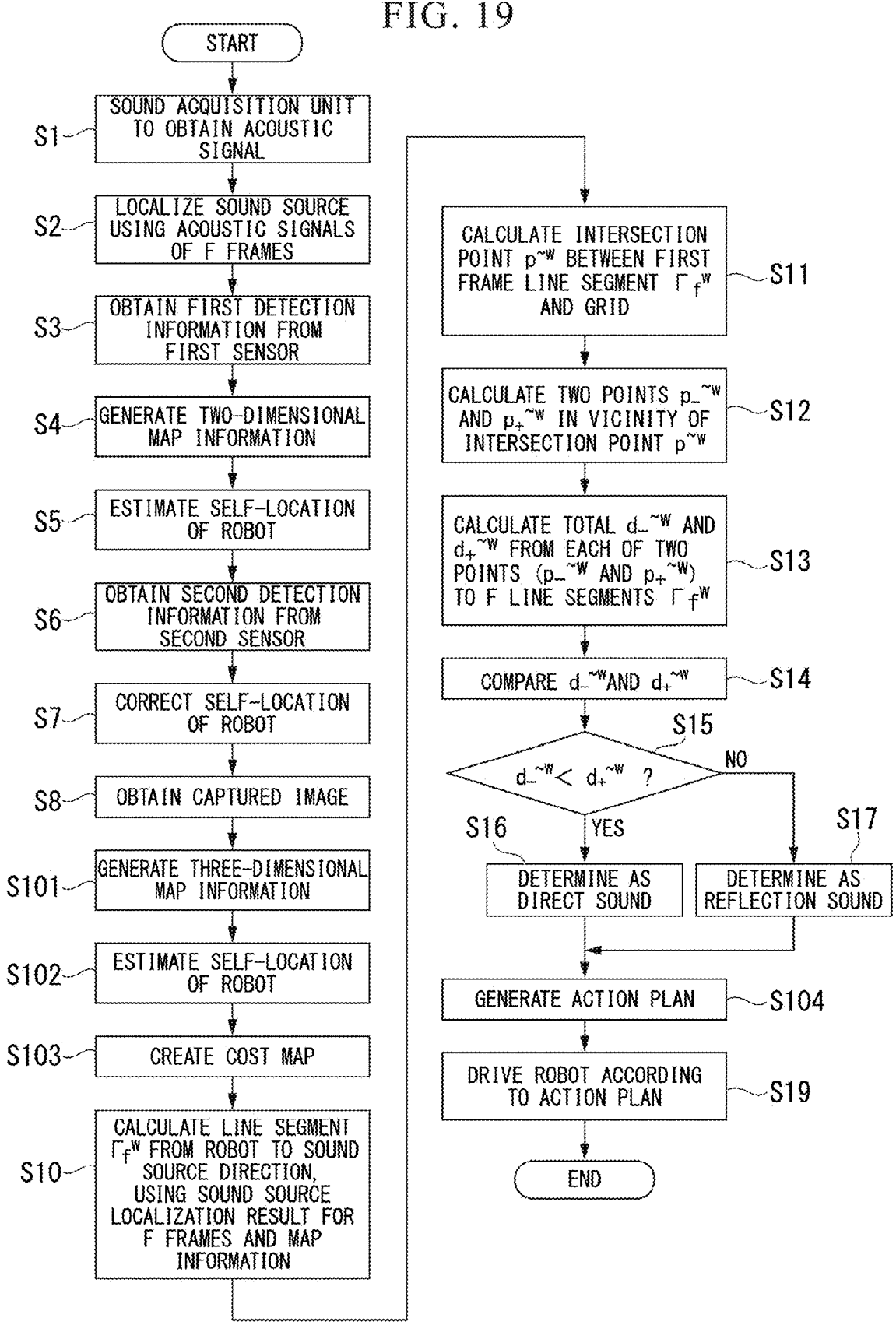
FIG. 19 is a flowchart of a process performed by the robot according to the second embodiment.

FIG. 19 is a flowchart of a process performed by the robot 1A according to the present embodiment. The same processes as those in the first embodiment, which have been described using FIG. 10, are given the same reference symbols, and descriptions thereof are omitted.

(Step S1 to S8) The robot 1 performs the processes of steps S1 to S8 in manners similar to that in FIG. 10 of the first embodiment, and the process proceeds to step S101.

(Step S101) The three-dimensional map information generation unit 142, by means of the three-dimensional SLAM method, generates three-dimensional map information as shown in FIG. 18, using the image input from the image capturing unit 60, and outputs the generated three-dimensional map information to the cost map unit 100A.

(Step S102) The three-dimensional self-location estimation unit 141, by means of the three-dimensional SLAM method, estimates a three-dimensional position in the robot coordinate system and inclination, using the image input from the image capturing unit 60, and outputs the estimation result to the action generation unit 110A.

(Step S103) The cost map unit 100A integrates the input two-dimensional map information with the three-dimensional map information, and it generates map information and outputs the generated map information to the action generation unit 110A. The cost map unit 100A causes the process to proceed to step S10.

(Step S10 to S15) The robot 1 performs the processes of steps S10 to S15 in manners similar to that in FIG. 10 of the first embodiment.

(Step S16) The reflective object detection unit 80 determines the focus point formed by the F line segments as being on the inner side of the wall, and determines the localized sound as being a direct sound. The reflective object detection unit 80 causes the process to proceed to step S104.

(Step S17) The reflective object detection unit 80 determines the focus point formed by the F line segments as being on the outer side of the wall, and determines the localized sound as being a reflection. The reflective object detection unit 80 causes the process to proceed to step S104.

(Step S104) The action generation unit 110A primarily uses the map information generated by the first map information generation unit 50. Moreover, in a case where a kidnapped robot problem occurs and the estimated self-location becomes significantly wrong while performing self-location estimation with use of the map information generated by the first map information generation unit 50, the action generation unit 110A re-sets the map information and self-location estimation information, using the f-th frame self-location information $p_f^w$ input from the second map information generation unit 140. Next, the action generation unit 110A generates an action plan of the robot 1, based on the self-location information $p_f^w$ input from the first map information generation unit 50, the sound source direction angle $\psi_f^w$ input from the sound source direction determination unit 90, and the cost map information generated by the cost map unit 100A. The action generation unit 110A causes the process to proceed to step S19.

(Step S19) The robot 1 performs the process of step S19 in a manner similar to that in FIG. 10 of the first embodiment.

The robot 1 repeats the above processes at predetermined temporal intervals for example.

As described above, the autonomous action robot (such as robot 1A) of the present embodiment is provided with an image capturing unit (such as image capturing unit 60) that captures images, and an integration unit (such as cost map unit 100A) that integrates the generated two-dimensional map information and a three-dimensional map information that uses a three-dimensional image based on the captured image, and the action generation unit (such as action generation unit 110A) generates an action plan, using the map information that is integrated by the integration unit.

With this configuration, the robot 1 of the present embodiment does not generate three-dimensional map information at all locations, but integrates the three-dimensional map information with the two-dimensional map information only for a predetermined region to thereby generate three-dimensional map information. As a result, the robot 1 of the present embodiment can obtain highly precise three-dimensional map information that uses visual information (captured image) at a low level of computation load, compared to the case of generating three-dimensional map information for all regions.

As with the first embodiment, the driving control unit 120 may perform control so that the moving speed of the robot 1 is faster when the sound source St is on the inner side of the wall (on the robot 1 side) than when the sound source is on the outer side of the wall.

Moreover, in the present embodiment, an example has been described in which there are provided two map information generation units namely, first map information generation unit 50 and second map information generation unit 140. However, there may be provided a single map information generation unit. In this case, a single map information generation unit may perform generation of two-dimensional map information, self-location estimation on the two-dimensional map, generation of three-dimensional map information, and self-location estimation on the three-dimensional map.

Moreover, in the first embodiment and second embodiment, as an example of an autonomous action robot, a robot (1 or 1A) that travels on a floor has been described. However, it is not limited to this. For example, the autonomous action robot may also be an air vehicle given that it is a moving body that is provided with a configuration of FIG. 1 or FIG. 17.

The air vehicle may be a rotary-winged vehicle having two or more rotors mounted thereon such as a multicopter and quadcopter.

Furthermore, in the present embodiment, walls have been used to describe the example of an obstacle. However, an obstacle is not limited to this. It may be an object that obstructs acoustic signals when the robot (1 or 1A) acquires sound by means of the sound acquisition unit 10, such as a screen, folding screen, partition, and signboard.

Moreover, in the first embodiment and second embodiment, an example has been described in which the image captured by the image capturing unit 60 is used for generating map information. However, it is not limited to this. For example, the type of sound source may be estimated, for example, by the action generation unit (110 or 110A) performing image recognition on the image captured by the image capturing unit 60, by means of a commonly known method. Here, examples of the sound source type include a human, a speaker device, a robot, and a device that is issuing warning sound. Accordingly, in the case of estimating the type of sound source, the action generation unit (110 or 110A) may generate an action plan according to the type of the estimated sound source. For example, in the case where it is estimated as a device that is issuing a warning sound, the action generation unit (110 or 110A) may, if the device has a display unit, approach the device and may capture the image of the display unit by means of the image capturing unit 60. Then, the action generation unit (110 or 110A) may transmit information such as a captured image, generated three-dimensional map information, self-location information, and sound source direction, to an administration center or the like (not shown in the figure), by means of a communication device (not shown in the figure).

Furthermore, in the case where the sound source or the object that is present when moving includes an identification image that can identify the object, the robot (1 or 1A) may capture an image that includes this image by means of the image capturing unit 60, and may perform image recognition on the captured image by means of a commonly known method. For example, in the second embodiment, the second map information generation unit 140 may recognize identification information from the image, and may embed the recognition result in the map information.

Moreover, in the first embodiment and second embodiment, an example has been described in which generation of two-dimensional map information and estimation of self-location are performed by means of the Hector SLAM method. However, another commonly known method may be used to perform generation of two-dimensional map information and estimation of self-location. Furthermore, map information generation and self-location estimation may use different methods respectively.

Furthermore, in the first embodiment and second embodiment, an example has been described in which the reflective object detection unit 80 uses two-dimensional map information generated by the first map information generation unit 50. However, it is not limited to this. For example, the two-dimensional map information in the three-dimensional map information integrated by the cost map unit 100 (or 100A) may be used.

As described above, in the first embodiment and second embodiment, the three-dimensional SLAM is not performed directly and the two-dimensional map information is generated by means of the high speed two-dimensional SLAM.

By integrating the image captured by the image capturing unit 60 with this two-dimensional map information, three-dimensional map information is generated within the range required for generating an action plan of the robot 1. As a result, according to the present embodiment, three-dimensional map information can be obtained on a real-time basis.

Moreover, in the present embodiment, self-location information estimated with use of the first sensor 30 is corrected, using the second detection information detected by the second sensor 40. As a result, estimation errors can be reduced in relation to angle and distance, even for irregular terrain.

Furthermore, in the present embodiment, in order to determine whether the acoustic signal of the localized sound source is present on the far side of the obstacle or on the robot side, determination is performed based on the relationship of two values that combine values of the F frames, as described above. As a result, compared to conventional techniques, it is possible to reduce computation load for determining whether it is a reflection or a direct sound.

A program for realizing the functions of the robot 1 (or 1A) may be recorded on a computer-readable recording medium, and by loading and executing this program recorded on a recording medium on a computer system, processes such as sound source direction estimation, obstacle estimation, determination of direct sound/reflection, and map information generation may be performed. The term "computer system" here includes an operating system as well as hardware such as peripheral devices. Moreover, the "computer system" includes a WWW system that is provided with a homepage provision environment (or display environment). Also, the term "computer-readable recording medium" refers to a portable medium such as flexible disk, magnetic optical disk, ROM, and CD-ROM, and/or a memory device such as a built-in hard disk of a computer system. Furthermore, the "computer-readable recording medium" includes one that retains a program for a certain length of time such as a volatile memory (RAM) inside a computer system that serves as a server and/or a client in those cases where a program is transmitted through a network such as the Internet or through a communication line such as a telephone line.

Moreover, the above program may be transmitted from the computer system having this program stored in a memory device thereof to another computer system via a transmission medium or by means of transmission waves within the transmission medium. Here, the "transmission medium" that transmits the program refers to a medium having an information transmission function, such as a network including the Internet (communication network) and a communication line including a telephone line (communication line). Moreover, the above program may realize part of the functions described above. Furthermore, it may be a so-called difference file (difference program) that can realize the functions described above, in combination with programs recorded on the computer system already.

What is claimed is:
1. An autonomous action robot comprising:
   a sound acquisition unit configured to acquire an acoustic signal;
   a sound source localization unit configured to estimate a direction of a sound source with respect to the acoustic signal, using the acquired acoustic signal;
   a distance measurement unit configured to perform measurements related to distance for a predetermined range;

a map information generation unit configured to generate two-dimensional map information and that estimates a self-location of the autonomous action robot, using information of the distance;

a sound source direction determination unit configured to re-estimate the direction of the sound source by determining whether the acoustic signal is a reflection reflected from a reflective object or a direct sound from the sound source, based on the two-dimensional map information, the estimated self-location information, and the estimated sound source direction;

an action generation unit configured to generate an action plan for moving toward a first direction if the acoustic signal is determined as a reflection and that generates an action plan for moving toward a second direction that differs from the first direction if the acoustic signal is determined as a direct sound, based on the two-dimensional map information and the sound source direction estimated by the sound source direction determination unit; and a control unit configured to control the autonomous action robot according to the action plan.

2. The autonomous action robot according to claim 1, wherein the second direction is a direction that is closer to the sound source than the first direction.

3. The autonomous action robot according to claim 1 further comprising a detection unit configured to detect angular velocity and acceleration of the autonomous action robot, and the map information generation unit corrects the estimated self-location, using detection results detected by the detection unit.

4. The autonomous action robot according to claim 1 further comprising
an image capturing unit configured to capture images, and
an integration unit configured to integrate the generated two-dimensional map information and three-dimensional map information that uses a three-dimensional image based on the captured image,
and the action generation unit generates an action plan, using map information that is integrated by the integration unit.

5. The autonomous action robot according to claim 1, wherein the sound source direction determination unit:
calculates a line segment that shows a relationship between an estimated self-location and an obstacle at each frame, using the sound source direction localized by the sound source localization unit and the estimated self-location that indicates the self-location estimated by the map information generation unit;
calculates an intersection point between the line segment and the obstacle at a given frame;
calculates two points in the vicinity of the calculated intersection point on the line segment at the given frame;
calculates the total distance from the calculated two points to the line segment at an f-th frame (where f is an integer not less than 2); and
determines whether the acoustic signal is a direct sound or a reflection based on the calculated results.

6. The autonomous action robot according to claim 5, wherein the sound source direction determination unit uses the sound source direction localized by the sound source localization unit and information showing the self-location estimated by the map information generation unit, and calculates the line segment $\Gamma_f^w$ that shows the relationship between the estimated self-location and the obstacle at each frame, using the following equation;

$$\Gamma_f^w(x^w, y^w) = \cos(\psi_f^r + \theta_f^w)(y^w - y_f^w) - \sin(\psi_f^r + \theta_f^w)(x^w - x_f^w) \quad \text{[Equation 1]}$$
$$= 0$$

(where $\psi_f^r$ is a direction angle to an acoustic signal at the f-th frame with respect to an x axis of the robot coordinate system $C^r$ at the f-th frame, $\theta_f^w$ is a direction angle from the x axis of the robot coordinate system $C^r$ to an x axis of a world coordinate system $C^w$, $y^w$ is a y coordinate in the world coordinate system, $x^w$ is an x coordinate in the world coordinate system, $y_f^w$ is a y coordinate in the world coordinate system at the f-th frame, and $x_f^w$ is an x coordinate in the world coordinate system at the f-th frame).

7. The autonomous action robot according to claim 5, wherein the sound source direction determination unit calculates two points $p_+^{\sim W}$ and $p_-^{\sim W}$ in the vicinity of the intersection point calculated on the line segment at the given frame, using the following equation;

$$\tilde{p}_\pm^W = p_1^w + (1 \pm \alpha)(\tilde{p}^w - p_1^W) \quad \text{[Equation 2]}$$

(where $p^{\sim W}$ is an intersection point between the line segment and the obstacle at the given frame, $p_1^W$ is a coordinate of the autonomous action robot at a first frame in a world coordinate system $C^w$, and $\alpha$ is a predetermined value).

8. The autonomous action robot according to claim 5, wherein the sound source direction determination unit calculates total distances $d_+^{\sim W}$ and $d_-^{\sim W}$ from the calculated two points to the line segment at the f-th frame, using the following equation;

$$\tilde{d}_\pm^W = \sum_{f=1}^{F} |\cos(\psi_f^r + \theta_f^w)(y_\pm^w - y_f^w) - \sin(\psi_f^r + \theta_f^w)(x_\pm^w - x_f^w)| \quad \text{[Equation 3]}$$

and if the calculated $d_-^{\sim W}$ is less than $d_+^{\sim w}$, the acoustic signal is determined as a direct sound, and if the calculated $d_-^{\sim W}$ is not less than $d_+^{\sim w}$, the acoustic signal is determined as a reflection.

9. The autonomous action robot according to claim 1, wherein a moving speed when progressing toward the second direction is faster than that at the time of progressing toward the first direction.

10. A control method for an autonomous action robot comprising:
a sound acquisition step of acquiring an acoustic signal by means of a sound acquisition unit;
a sound source localization step of estimating a direction of a sound source with respect to the acoustic signal, using the acquired acoustic signal, by means of a sound source localization unit;
a distance measurement step of performing measurements related to distance for a predetermined range by means of a distance measurement unit;
a map information generation step of generating two-dimensional map information and estimating a self-location of the autonomous action robot, using information of the distance, by means of a map information generation unit;
a sound source direction determination step of re-estimating the direction of the sound source by determining whether the acoustic signal is a reflection reflected from a reflective object or a direct sound from the sound source, based on the two-dimensional map information, the estimated self-location information, and the estimated sound source direction, by means of a sound source direction determination unit;

an action generation step of generating an action plan for moving toward a first direction if the acoustic signal is determined as a reflection and generating an action plan for moving toward a second direction that differs from the first direction if the acoustic signal is determined as a direct sound, based on the two-dimensional map information and the sound source direction estimated by the sound source direction determination unit, by means of an action generation unit; and a control step of controlling the autonomous action robot according to the action plan, by means of a control unit.

* * * * *